United States Patent
Sano et al.

(10) Patent No.: US 7,424,561 B2
(45) Date of Patent: *Sep. 9, 2008

(54) SYSTEMS USING MIX OF PACKET, COHERENT, AND NONCOHERENT TRAFFIC TO OPTIMIZE TRANSMISSION BETWEEN SYSTEMS

(75) Inventors: Barton J. Sano, Fremont, CA (US); Joseph B. Rowlands, Santa Clara, CA (US); Laurent R. Moll, Saratoga, CA (US); Manu Gulati, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/717,511

(22) Filed: Mar. 13, 2007

(65) Prior Publication Data
US 2007/0214230 A1    Sep. 13, 2007

Related U.S. Application Data

(63) Continuation of application No. 10/269,922, filed on Oct. 11, 2002, now Pat. No. 7,206,879.

(60) Provisional application No. 60/380,740, filed on May 15, 2002, provisional application No. 60/331,789, filed on Nov. 20, 2001, provisional application No. 60/344,713, filed on Dec. 24, 2001, provisional application No. 60/348,777, filed on Jan. 14, 2002, provisional application No. 60/348,717, filed on Jan. 14, 2002.

(51) Int. Cl.
*G06F 13/42* (2006.01)
*G06F 13/14* (2006.01)
*G06F 13/36* (2006.01)
*G06F 12/00* (2006.01)

(52) U.S. Cl. ............ 710/105; 710/305; 710/308; 711/141

(58) Field of Classification Search ............ 710/22–23, 710/105–106, 305–306, 308; 709/250; 370/356, 370/389; 711/141, 146
See application file for complete search history.

(56) References Cited

U.S. PATENT DOCUMENTS 4,630,193 A * 12/1986 Kris ................... 713/502

(Continued)

FOREIGN PATENT DOCUMENTS

EP    0777179 B1 * 10/1996

(Continued)

OTHER PUBLICATIONS

"HyperTransport Technology I/O Link". White Paper. Advanced Micro Devices, Inc. Jul. 20, 2001. #25012A.*

(Continued)

*Primary Examiner*—Mark Rinehart
*Assistant Examiner*—Thomas J. Cleary
(74) *Attorney, Agent, or Firm*—Garlick Harrison & Markison

(57) ABSTRACT

An apparatus may include a first system and a second system. The first system includes a first plurality of interface circuits, and each of the first plurality of interface circuits is configured to couple to a separate interface. The second system includes a second plurality of interface circuits, and each of the second plurality of interface circuits is configured to couple to a separate interface. A first interface circuit of the first plurality of interface circuits and a second interface circuit of the second plurality of interface circuits are coupled to a first interface. Both the first interface circuit and the second interface circuit are configured to communicate packets, coherency commands, and noncoherent commands on the first interface.

6 Claims, 19 Drawing Sheets

U.S. PATENT DOCUMENTS

| | | | | |
|---|---|---|---|---|
| 4,788,679 | A * | 11/1988 | Kataoka et al. | 370/413 |
| 5,644,753 | A * | 7/1997 | Ebrahim et al. | 711/131 |
| 5,710,907 | A * | 1/1998 | Hagersten et al. | 711/148 |
| 5,797,026 | A * | 8/1998 | Rhodehamel et al. | 712/1 |
| 5,805,590 | A * | 9/1998 | Gillard et al. | 370/395.4 |
| 5,887,138 | A * | 3/1999 | Hagersten et al. | 709/215 |
| 5,920,226 | A * | 7/1999 | Mimura | 327/537 |
| 5,925,097 | A * | 7/1999 | Gopinath et al. | 709/200 |
| 5,961,623 | A * | 10/1999 | James et al. | 710/113 |
| 5,963,745 | A * | 10/1999 | Collins et al. | 712/13 |
| 6,009,426 | A * | 12/1999 | Jouenne et al. | 707/8 |
| 6,070,215 | A * | 5/2000 | Deschepper et al. | 710/309 |
| 6,094,715 | A * | 7/2000 | Wilkinson et al. | 712/20 |
| 6,101,420 | A * | 8/2000 | VanDoren et al. | 700/5 |
| 6,105,119 | A * | 8/2000 | Kerr et al. | 711/219 |
| 6,108,739 | A * | 8/2000 | James et al. | 710/113 |
| 6,108,752 | A * | 8/2000 | VanDoren et al. | 711/117 |
| 6,128,728 | A * | 10/2000 | Dowling | 712/228 |
| 6,138,217 | A * | 10/2000 | Hamaguchi | 711/141 |
| 6,182,201 | B1 * | 1/2001 | Arimilli et al. | 711/202 |
| 6,185,520 | B1 * | 2/2001 | Brown et al. | 703/25 |
| 6,202,132 | B1 * | 3/2001 | Islam et al. | 711/141 |
| 6,209,065 | B1 * | 3/2001 | Van Doren et al. | 711/150 |
| 6,219,755 | B1 * | 4/2001 | Klein | 711/118 |
| 6,249,846 | B1 * | 6/2001 | Van Doren et al. | 711/144 |
| 6,295,057 | B1 * | 9/2001 | Rosin et al. | 715/744 |
| 6,298,370 | B1 * | 10/2001 | Tang et al. | 718/102 |
| 6,338,122 | B1 * | 1/2002 | Baumgartner et al. | 711/141 |
| 6,449,701 | B1 * | 9/2002 | Cho | 711/154 |
| 6,681,283 | B1 * | 1/2004 | Thekkath et al. | 710/305 |
| 2001/0039604 | A1 * | 11/2001 | Takahaski | 711/141 |
| 2002/0038407 | A1 * | 3/2002 | Mounes-Toussi et al. | 711/141 |
| 2003/0037224 | A1 * | 2/2003 | Oehler et al. | 712/29 |
| 2003/0097467 | A1 * | 5/2003 | Sano | 709/238 |
| 2003/0097498 | A1 * | 5/2003 | Sano et al. | 710/22 |

FOREIGN PATENT DOCUMENTS

| | | | |
|---|---|---|---|
| EP | 0936555 | A2 * | 2/1998 |
| EP | 0893766 | A2 * | 1/1999 |
| EP | 0945805 | A1 * | 9/1999 |
| WO | WO 98/15155 | * | 4/1998 |
| WO | WO 00/38069 | * | 6/2000 |

OTHER PUBLICATIONS

Wong, William. "High-Performance Proccessor Interconnect Gains Wide Support". Electronic Design. Penton Media, Inc. Oct. 14, 2002. Retrieved from Internet Oct. 24, 2005. ED Online ID #1974. <http://www.elecdesign.com/Articles/Pring.cfm?ArticleID=1974>.*

Wong, William. "Quad 64-Bit Multiproccessor Targets Comm Applications". Electronic Design. Penton Media, Inc. Oct. 14, 2002. Retrieved from Internet Oct. 24, 2005. ED Online #1968>.*

Levy, Markus. "Chip Combines Four 1 Ghz Cores". Microprocessor Report. Reed Electronics Group. Oct. 16, 2002.*

European Search Report for EP26008 (02025686.3-2415-), mailed Feb. 27, 2003. 3 pages.*

Lenoski, Daniel. "The Design and Analysis of Dash: A Scalable Directory-Based Multiprocessor". Dec. 1991. A Dissertation submitted to the Dept. of Electrical Engineering and the Committee on Graduate Studies of Stanford University. 176 pages.*

Saulsbury et al. "An Argument for Simple COMA". Aug. 1, 1994. SISC Research Report No. R94:15. 20 Pages.*

Halfhill, Tom. "SiByte Reveals 64-Bit Core for NPUs: Independent MIPS64 Design Combines Low Power, High Performance". Microdesign Resources. Jun. 2000. Microprocessor Report. 4 Pages.*

"Target Applications" SiByte. Jan. 15, 2001. <http://sibyte.com/mercurian/applications.htm>.*

"SiByte Technology". SiByte. Jan. 15, 2001. <http://sibyte.com/mercurian/technology.htm>.*

"The Murcurian Processor". SiByte. Jan 15, 2001. <http://sibyte.com/mercurian>.*

"Fact Sheet". Revision 0.1. SB-1 CPU. SiByte. Oct. 2000.*

"Fact Sheet". Revision 0.2. SB-1250. SiByte. Oct. 2000.*

Stepanian. "SiByte SB-1 MIPS64 CPU Core". Embedded Processor Forum 2000. Jun. 13, 2000. 15 Pages.*

Keller, Jim. "The Mercurian Processor: A High Performance, Power-Efficient CMP for Networking". Oct. 10, 2000. 22 Pages.*

"21143 PCI/CardBus 10/100Mb/s Ethernet LAN Controller". Revision 1.0. Hardware Reference Manual. Intel. Oct. 1998. 219 Pages.*

European Search Report for EP Application No. 02025691.3.*

Giorgi et al. "PSCR: A Coherence Protocol for Eliminating Passive Sharing in Shared-Bus Shared-Memory Multiprocessors". IEEE Transactions on Parallel and Distributed Systems. vol. 10, No. 7. Jul. 1999.*

* cited by examiner

Interconnect Transactions

| Transaction |
|---|
| RdShd |
| RdExc |
| Wr |
| WrInv |
| RdKill |
| RdInv |
| WrFlush |
| Nop |

— 142

HTcc Commands

| Command | Virtual Channel |
|---|---|
| cRdShd | CRd |
| cRdExc | CRd |
| Flush | Probe |
| Kill | Probe |
| Kill_Ack | Ack |
| WB | Ack |
| Fill | CFill |

| Source | Transaction | RLD State | New RLD State | Set Owner? | Reset Other Owners? |
|---|---|---|---|---|---|
| Local | RdExc | S | — | — | — |
| Local | RdExc | M | — | — | — |
| Local | RdShd | M | — | — | — |
| Remote | RdExc | S | M | yes | yes |
| Remote | RdExc | M | M | yes | yes |
| Remote | RdExc | I | M | yes | n/a |
| Remote | RdShd | S | S | yes | no |
| Remote | RdShd | M | S | yes | yes |
| Remote | RdShd | I | S | yes | n/a |
| Either | WrInv | S or M | I | — | — |

FIG. 18

SYSTEMS USING MIX OF PACKET, COHERENT, AND NONCOHERENT TRAFFIC TO OPTIMIZE TRANSMISSION BETWEEN SYSTEMS

This application is a continuation of and claims priority to U.S. patent application having an application Ser. No. 10/269,922; filed Oct. 11, 2002; now U.S. Pat. No.7,206,879 which application claims benefit of priority to the following U.S. Provisional Patent Applications: Ser. No. 60/380,740, filed May 15, 2002; Ser. No. 60/331,789, filed Nov. 20, 2001; Ser. No. 60/344,713, filed Dec. 24, 2001; Ser. No. 60/348,777, filed Jan. 14, 2002; and Ser. No. 60/348,717, filed Jan. 14, 2002; of which all are hereby incorporated by reference.

BACKGROUND OF THE INVENTION

1. Field of the Invention

This invention is related to the fields of packet processing and coherency.

2. Description of the Related Art

With the continued expansion of networks and networked systems (e.g. local area networks (LANs), wide area networks (WANs), the Internet, etc.), packet processing is an increasingly important function for a variety of systems. The amount of packet processing to be performed may be increasing due to the increased amount of packet traffic, as well as the more sophisticated packet processing that is being attempted on each packet (e.g. processing at deeper layers of the packet).

A packet processing system must therefore be capable of receiving packets for processing and transmitting processed packets (or newly generated packets). Additionally, it may be desirable for a packet processing systems to be scalable, so that the packet processing system may be expanded to handle increased packet processing responsibilities. Furthermore, efficiently handling the traffic within the packet processing system as it is scaled may be desirable.

SUMMARY OF THE INVENTION

The present invention is directed to apparatus and methods of operation that are further described in the following Brief Description of the Drawings, the Detailed Description of the Embodiments of the Invention, and the Claims. Other features and advantages of the present invention will become apparent from the following detailed description of the embodiments of the invention made with reference to the accompanying drawings.

BRIEF DESCRIPTION OF THE DRAWINGS

The following detailed description makes reference to the accompanying drawings, which are now briefly described.

FIG. 13 is a table of exemplary transaction and exemplary coherency commands.

FIG. 18 is a table illustrating exemplary updates of one embodiment of a remote line directory.

Figure 1:
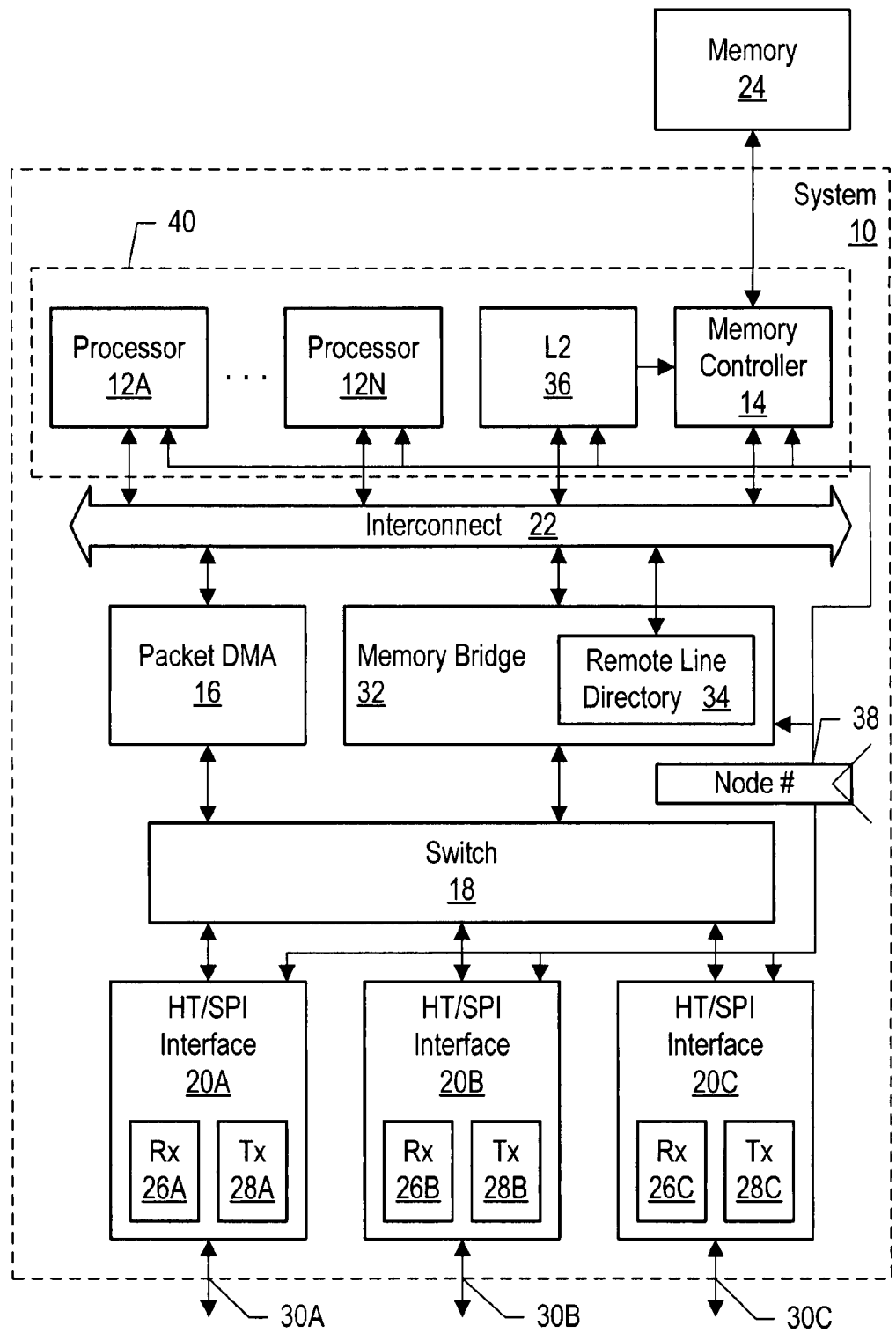
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the embodiment of FIG. 1, the system 10 includes one or more processors 12A-12N, a memory controller 14, a switch 18, a set of interface circuits 20A-20C, a memory bridge 32, a packet direct memory access (DMA) circuit 16, and an L2 cache 36. The memory bridge 32 includes a remote line directory 34. The system 10 includes an interconnect 22 to which the processors 12A-12N, the memory controller 14, the L2 cache 36, the memory bridge 32, the packet DMA circuit 16, and the remote line directory 34 are coupled. The system 10 is coupled, through the memory controller 14, to a memory 24. The interface circuits 20A-20C each include a receive (Rx) circuit 26A-26C and a transmit (Tx) circuit 28A-28C. The system 10 is coupled to a set of interfaces 30A-30C through respective interface circuits 20A-20C. The interface circuits 20A-20C are coupled to the switch 18, which is further coupled to the memory bridge 32 and the packet DMA circuit 16. A configuration register 38 is also illustrated in FIG. 1, which stores a node number (Node #) for the system 10. The configuration register 38 is coupled to the L2 cache 36, the memory controller 14, the memory bridge 32, and the interface circuits 20A-20C in the embodiment of FIG. 1. The processors 12A-12N may also be coupled to receive the node number from the configuration register 38.

The system 10 may be configurable as a node in a multinode coherent system. In such a coherent system, internode coherency may be maintained via coherency commands transmitted to the system 10 and by the system 10 on one or more of the interfaces 30A-30C (via the interface circuits 20A-20C, respectively). Additionally, packets may be transmitted/received on one or more interfaces 30A-30C (via the interface circuits 20A-20C). Furthermore, noncoherent commands (e.g. communications with input/output (I/O) circuits) may be transmitted/received on one or more interfaces 30A-30C. Thus, a mix of packet, noncoherent, and coherent traffic may be received on the interfaces 30A-30C. Particularly, at least one of the interfaces 30A-30C may carry a mix of packet, noncoherent, and coherent traffic.

As used herein, a memory bridge includes circuitry designed to handle internode coherency functions within a node. Thus, the memory bridge 32 may be a source/destination of the coherency commands. In response to at least some received coherency commands, the memory bridge 32 may generate corresponding transactions on the interconnect 22. In response to at least some transactions on the interconnect 22 generated by other agents, the memory bridge 32 may generate coherency commands. The memory bridge 32 may also handle transmission and processing of noncoherent commands, in one embodiment.

As used herein, a packet DMA circuit comprises circuitry to communicate packets to and from a memory. The packet DMA circuit 16 may generate write transactions on the interconnect 22 to the memory controller 14 to write received packets to the memory 24, and may generate read transactions on the interconnect 22 to read packets from the memory 24 for transmission by one of the interface circuits 20A-20C.

The switch 18 may separate coherent traffic and packet traffic from the interface circuits 20A-20C, routing the coherent traffic to the memory bridge 32 and routing the packet traffic to the packet DMA circuit 16. In one embodiment, the switch 18 may generally select sources and destinations to be coupled for communication based on requests from the sources to transmit data and requests from the destinations for data. For example, the interface circuits 20A-20C (particularly the Rx circuits 26A-26C) may identify coherency commands and packets received on the interfaces 30A-30C, and may request transfer to the packet DMA circuit 16 (for packets) and the memory bridge 32 (for coherency commands). If the packet DMA circuit 16 or memory bridge 32 has indicated the ability to receive data of the corresponding type, the switch 18 may grant a transfer between a requesting Rx circuit 26A-26C and the packet DMA circuit 16 or the memory bridge 32. Similarly, the packet DMA circuit 16 or memory bridge 32 may request a transfer to an interface circuit 20A-20C (particularly, to a Tx circuit 28A-28C). If the Tx circuit 28A-28C has indicated the ability to receive data of the corresponding type, the switch 18 may grant a transfer between the requesting packet DMA circuit 16/memory bridge 32 and the Tx circuit 28A-28C.

In one embodiment, the interfaces 30A-30C may support a set of virtual channels in which coherency commands, noncoherent commands, and packets are transmitted. Each virtual channel is defined to flow independent of the other virtual channels, even though the virtual channels may share certain physical resources (e.g. the interface 30A-30C on which the commands are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received. The switch virtual channels may identify a destination and a virtual channel at that destination, and they may be referred to as the destination and virtual channel, or collectively as the switch virtual channel, herein.

Additionally, in some embodiments, the switch 18 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary. A similar boundary condition may be used for coherency commands, if more than one transfer through the switch 18 is used to transfer coherency commands.

Each of the interfaces 30A-30C used for coherent communications are defined to be capable of transmitting and receiving coherency commands. Particularly, in the embodiment of FIG. 1, those interfaces 30A-30C may be defined to receive/transmit coherency commands to and from the system 10 from other nodes. Additionally, other types of commands may be carried. In one embodiment, each interface 30A-30C that is used to carry coherency commands may be a HyperTransport™ (HT) interface, including an extension to the HT interface to include coherency commands (HTcc). Additionally, in some embodiments, an extension to the HyperTransport interface to carry packet data (Packet over HyperTransport, or POHT) may be supported. As used herein, coherency commands include any communications between nodes that are used to maintain coherency between nodes. The commands may include read or write requests initiated by a node to fetch or update a cache block belonging to another node, probes to invalidate cached copies of cache blocks in remote nodes (and possibly to return a modified copy of the cache block to the home node), responses to probe commands, fills which transfer data, etc. A noncoherent command is a communication between devices that does not necessarily occur coherently. For example, standard HT commands may be noncoherent commands.

A given HT interface may thus carry a mix of coherent, noncoherent and packet traffic. Traffic on a given HT interface received by one of the interface circuits 20A-20C may be routed: (i) to the packet DMA circuit 16 (for a PoHT command); (ii) the memory bridge 32 (for a coherent command or non-coherent command to be processed in the system 10); or (iii) another interface circuit 20A-20C (for any type of command not targeted at the system 10). The virtual channels on the HT interfaces may include the standard HT virtual channels as well as some additional virtual channels defined for the HTcc and/or PoHT extensions. The HTcc virtual channels are shown in FIG. 13, and the PoHT extensions may include a number of packet virtual channels (e.g. 16 virtual channels, in one embodiment).

In some embodiments, one or more of the interface circuits 20A-20C may not be used for coherency management and may be defined as packet interfaces. The corresponding interfaces 30A-30C may be HT interfaces using the PoHT extension. Alternative, such interfaces 30A-30C may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In the illustrated embodiment, each interface circuit 20A-20C may be configurable to communicate on either the SPI-4 interface or the HT interface. Each interface circuit 20A-20C may be individually programmable, permitting various combinations of the HT and SPI-4 interfaces as interfaces 30A-30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The packet interfaces may carry packet data directly (e.g. transmitting the packet data with various control information indicating the start of packet, end of packet, etc.) or indirectly (e.g. transmitting the packet data as a payload of a command, such as POHT). The SPI-4 interface may define 16 hardware virtual channels, extendable to 256 virtual channels in software.

An overview of one embodiment of the internode coherency mechanism is next provided. Additional details regarding the internode coherency mechanism (for one embodiment) are provided further below (e.g. with regard to FIGS. 13-18).

The system 10 may support intranode coherency for transactions on the interconnect 22. Additionally, the system 10 may support internode coherency with other nodes (e.g. a CC-NUMA coherency, in one embodiment). For example, in one embodiment, if a transaction on the interconnect 22 (e.g. a transaction issued by the processors 12A-12N) accesses a cache block that is remote to the system 10 (i.e. the cache block is part of the memory coupled to a different node) and the system 10 does not have sufficient ownership to perform the transaction, the memory bridge 32 may issue one or more coherency commands to the other nodes to obtain the ownership (and a copy of the cache block, in some cases). Similarly, if the transaction accesses a local cache block but one or more other nodes have a copy of the cache block, the memory bridge 32 may issue coherency commands to the other nodes. Still further, the memory bridge 32 may receive coherency commands from other nodes, and may perform transactions on the interconnect 22 to effect the coherency commands.

In one embodiment, a node such as system 10 may have memory coupled thereto (e.g. memory 24). The node may be responsible for tracking the state, in other nodes, of each cache block from the memory in that node. A node is referred to as the "home node" for cache blocks from the memory assigned to that node. A node is referred to as a "remote node" for a cache block if the node is not the home node for that cache block. Similarly, a cache block is referred to as a local cache block in the home node for that cache block and as a remote cache block in other nodes.

Generally, a remote node may begin the coherency process by requesting a copy of a cache block from the home node of that cache block using a coherency command. The memory bridge 32 in the remote node, for example, may detect a transaction on the interconnect 22 that accesses the cache block and may detect that the remote node does not have sufficient ownership of the cache block to complete the transaction (e.g. it may not have a copy of the cache block at all, or may have a shared copy and may require exclusive ownership to complete the transaction). The memory bridge 32 in the remote node may generate and transmit the coherency command to the home node to obtain the copy or to obtain sufficient ownership. The memory bridge 32 in the home node may determine if any state changes in other nodes are to be performed to grant the requested ownership to the remote node, and may transmit coherency commands (e.g. probe commands) to effect the state changes. The memory bridge 32 in each node receiving the probe commands may effect the state changes and respond to the probe commands. Once the responses have been received, the memory bridge 32 in the home node may respond to the remote node (e.g. with a fill command including the cache block).

The remote line directory 34 may be used in the home node to track the state of the local cache blocks in the remote nodes. The remote line directory 34 is updated each time a cache block is transmitted to a remote node, the remote node returns the cache block to the home node, or the cache block is invalidated via probes. As used herein, the "state" of a cache block in a given node refers to an indication of the ownership that the given node has for the cache block according to the coherency protocol implemented by the nodes. Certain levels of ownership may permit no access, read-only access, or read-write access to the cache block. For example, in one embodiment, the modified, shared, and invalid states are supported in the internode coherency protocol. In the modified state, the node may read and write the cache block and the node is responsible for returning the block to the home node if evicted from the node. In the shared state, the node may read the cache block but not write the cache block without transmitting a coherency command to the home node to obtain modified state for the cache block. In the invalid state, the node may not read or write the cache block (i.e. the node does not have a valid copy of the cache block). Other embodiments may use other coherency protocols (e.g. the MESI protocol, which includes the modified, shared, and invalid states and an exclusive state in which the cache block has not yet been updated but the node is permitted to read and write the cache block, or the MOESI protocol which includes the modified, exclusive, shared, and invalid states and an owned state which indicates that there may be shared copies of the block but the copy in main memory is stale). In one embodiment, agents within the node may implement the MESI protocol for intranode coherency. Thus, the node may be viewed as having a state in the internode coherency and individual agents may have a state in the intranode coherency (consistent with the internode coherency state for the node containing the agent).

Generally speaking, a node may include one or more coherent agents (dotted enclosure 40 in FIG. 1). In the embodiment of FIG. 1, the processors 12A-12N, the L2 cache 36, and the memory controller 14 may be examples of coherent agents 40. Also, the memory bridge 32 may be a coherent agent (as a proxy for other nodes, based on the state in the remote line directory 34). However, other embodiments may include other coherent agents as well, such as a bridge to one or more I/O interface circuits, or the I/O interface circuits themselves. Generally, an agent includes any circuit which participates in transactions on an interconnect. A coherent agent is an agent that is capable of performing coherent transactions and/or operating in a coherent fashion with regard to transactions. A transaction is a communication on an interconnect. The transaction is sourced by one agent on the interconnect, and may have one or more agents as a target of the transaction. Read transactions specify a transfer of data from a target to the source, while write transactions specify a transfer of data from the source to the target. Other transactions may be used to communicate between agents without transfer of data, in some embodiments.

In one embodiment, the remote line directory 34 may be configured to track a subset of the local memory space that may be coherently shared with other nodes. That is, the remote line directory 34 may be configured to track up to a maximum number of cache blocks, where the maximum number is less than the total number of cache blocks that may be coherently shared. In another embodiment, the maximum number may be less than the total number of remote cache entries. The remote line directory may have any structure (e.g. cache-like structures such as direct-mapped, fully associative, set associative, etc.). In one embodiment, the remote line directory 34 may be 16 k entries arranged in an 8 way set associative structure. If a cache block is being accessed by a remote node, and the remote line directory 34 in the home node detects a miss for the cache block, an entry is allocated to track the cache block. If the allocated entry is currently allocated to track a second cache block, the memory bridge 32 in the home node may generate probes to evict the second cache block from the other nodes (and possibly write back modified data to the home node, if applicable).

In one implementation, the L2 cache 36 in a remote node is designated to retain the node state for modified remote cache blocks. If the L2 cache 36 evicts a modified remote cache block, the L2 cache 36 may cause the remote block to be evicted from the node as a whole (e.g. using a WrFlush command described below).

It is noted that, in some embodiments, a coherency command may be received by an interface circuit 20A-20C that is passing through the system 10 to another node, and does not require processing in the system 10. The interface circuits 20A-20C may be configured to detect such commands and retransmit them (through another interface circuit 20A-20C via the switch 18) without involving the memory bridge 32.

An overview of the packet processing mechanism of one embodiment of the system 10 is next provided. Additional details of one embodiment may be provided below with respect to FIGS. 7-12.

The system 10 may provide a flexible structure for processing packets and for routing packets without processing by the processors 12A-12N. In one embodiment, the Rx circuits 26A-26C may be programmable to select destinations for packets based on one or more packet attributes. For example, packets may be transmitted on the interfaces 30A-30C in a virtual channel on that interface. The virtual channel may be a packet attribute used for selecting a destination. Additionally, the Rx circuits 26A-26C may be programmable to select one or more packet fields to use in determining a destination. For packets generated by software, the software may select a destination for the packet (e.g. by selecting an output queue in the packet DMA circuit 16 mapped to a given Tx circuit 28A-28C and to a virtual channel on the corresponding interface).

Two or more instantiations of the system 10 may be coupled together to form packet processing systems in which packets are routed among the systems as well as packet circuits. If the Rx circuit 26A-26C receives a packet and determines that the destination for the packet is a Tx circuit 28A-28C (to be transmitted to another system 10 or elsewhere), the Rx circuit 26A-26C may transmit the packet through the switch 18 to the Tx circuit 28A-28C. The packet may not be transmitted to memory, nor acted upon by the processors 12A-12N. Thus, memory bandwidth, storage, and processor time may be used to process packets which are not automatically routed from a source to a destination. In packet processing systems including multiple systems 10, a packet may be routed from an Rx circuit 26A-26C to a Tx circuit 28A-28C that is coupled to an interface to the other system 10, and the Rx circuit 28A-28C in the other system 10 that is coupled to that interface may determine that the destination of the packet is the packet DMA circuit 16 in the other system 10. Alternatively, a packet may be routed through one or more Rx and Tx circuits 26A-26C and 28A-28C from a packet source device to a packet destination device, without any processing by processors 12A-12N in the systems 10.

The Rx circuits 26A-26C may determine that received packets are to be stored to the memory 24 (by the packet DMA circuit 16) for processing within the system 10. In one embodiment, the packet DMA circuit 16 may comprise a set of input queues (the virtual channels in the packet DMA circuit 16) to which a packet may be mapped by the Rx circuits 26A-26C. The switch 18 may route the packets to the packet DMA circuit 16 for storage in the identified input queue. Similarly, software may generate packets and store them in packet DMA circuit output queues. The output queues may be mapped to a Tx circuit 28A-28C (and an output virtual channel in the Tx circuit 28A-28C), and the switch 18 may route packets from the packet DMA circuit 16 to the Tx circuit 28A-28C.

In one embodiment, the input queues and the output queues of the packet DMA circuit 16 may be logical queues. That is, the queues may actually be implemented in memory 24. The packet DMA circuit 16 may include buffers to buffer the packet data being transmitted to and from the memory 24. The queues may be implemented in any fashion. In one particular embodiment, each queue is implemented as a descriptor ring (or chain) which identifies memory buffers to store packet data corresponding to a given input queue. In other embodiments, the queues may be implemented in any desired fashion (e.g. link lists, contiguous memory locations for memory buffers, etc.).

Packets stored to memory by the packet DMA circuit 16 may be processed by software executed by the processors 12A-12N (or software executed on a processor in a remote node, using internode coherency to coherently access the packets). The software may determine that a given packet is terminated in the system 10. Alternatively, the processors 12A-12N may determine that the packet is to be retransmitted on one of the interfaces 30A-30C, and may prepare the packet for transmission by the packet DMA circuit 16. The packet may have been modified by software, or may be unmodified. Additionally, the software may generate packets to be transmitted. In any of these cases, the software may inform the packet DMA circuit 16 of the packet and its location in the memory 24, so that the packet DMA circuit 16 may read the packet from the memory 24 for transmission to the interface circuit 20A-20C coupled to the interface 30A-30C on which the packet is to be transmitted. In one embodiment, the software may inform the packet DMA circuit 16 of the packet by storing the packet in one or more memory buffers indicated by descriptors in the descriptor ring forming an output queue, and updating the descriptor to indicate that the packet DMA circuit 16 owns the descriptor. As an alternative to updating the descriptor (or in addition to updating the descriptor), software may update a descriptor count in the packet DMA circuit 16 to indicate that the packet DMA circuit 16 owns the descriptor.

As used herein, a "packet" may include any communication between a source and a destination which includes one or more headers defining the source and destination of the packet at various levels within the source and destination and which may include a data payload. "Packet data" may include any data that is part of a packet, or may refer to multiple packets.

As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

The processors 12A-12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 10 may include any number of processors (e.g. as few as one processor, two processors, four processors, etc.).

The L2 cache 36 may be any type and capacity of cache memory, employing any organization (e.g. set associative, direct mapped, fully associative, etc.). In one embodiment, the L2 cache 36 may be an 8 way, set associative, 1 MB cache. The L2 cache 36 is referred to as L2 herein because the processors 12A-12N may include internal (L1) caches. In other embodiments the L2 cache 36 may be an L1 cache, an L3 cache, or any other level as desired.

The memory controller 14 is configured to access the memory 24 in response to read and write transactions received on the interconnect 22. The memory controller 14 may receive a hit signal from the L2 cache, and if a hit is detected in the L2 cache for a given read/write transaction, the memory controller 14 may not respond to that transaction. The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique (e.g. TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the system 10 may include additional circuitry, not shown in FIG. 1. For example, the system 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the system 10 (and more particularly the processors 12A-12N, the memory controller 14, the L2 cache 36, the interface circuits 20A-20C, the memory bridge 32 including the remote line directory 34, the packet DMA circuit 16, the switch 18, the configuration register 38, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A-20C are illustrated in FIG. 1, one or more interface circuits may be implemented in various embodiments. It is further noted that, while the cache block may be referred to as the granularity on which coherency is maintained, other embodiments may use different granularities greater than or less than a cache block in size. In such embodiments, a "coherency block" may be treated in the same fashion as a "cache block" or "block" when discussing coherency above. Generally, a "coherency block" may include a set of contiguous (in memory) bytes which are treated as a unit for coherency purposes. In various embodiments, a coherency block may comprise a portion of a cache block, a single cache block, or multiple cache blocks, as desired.

Packet Processing System Examples

Figure 2:
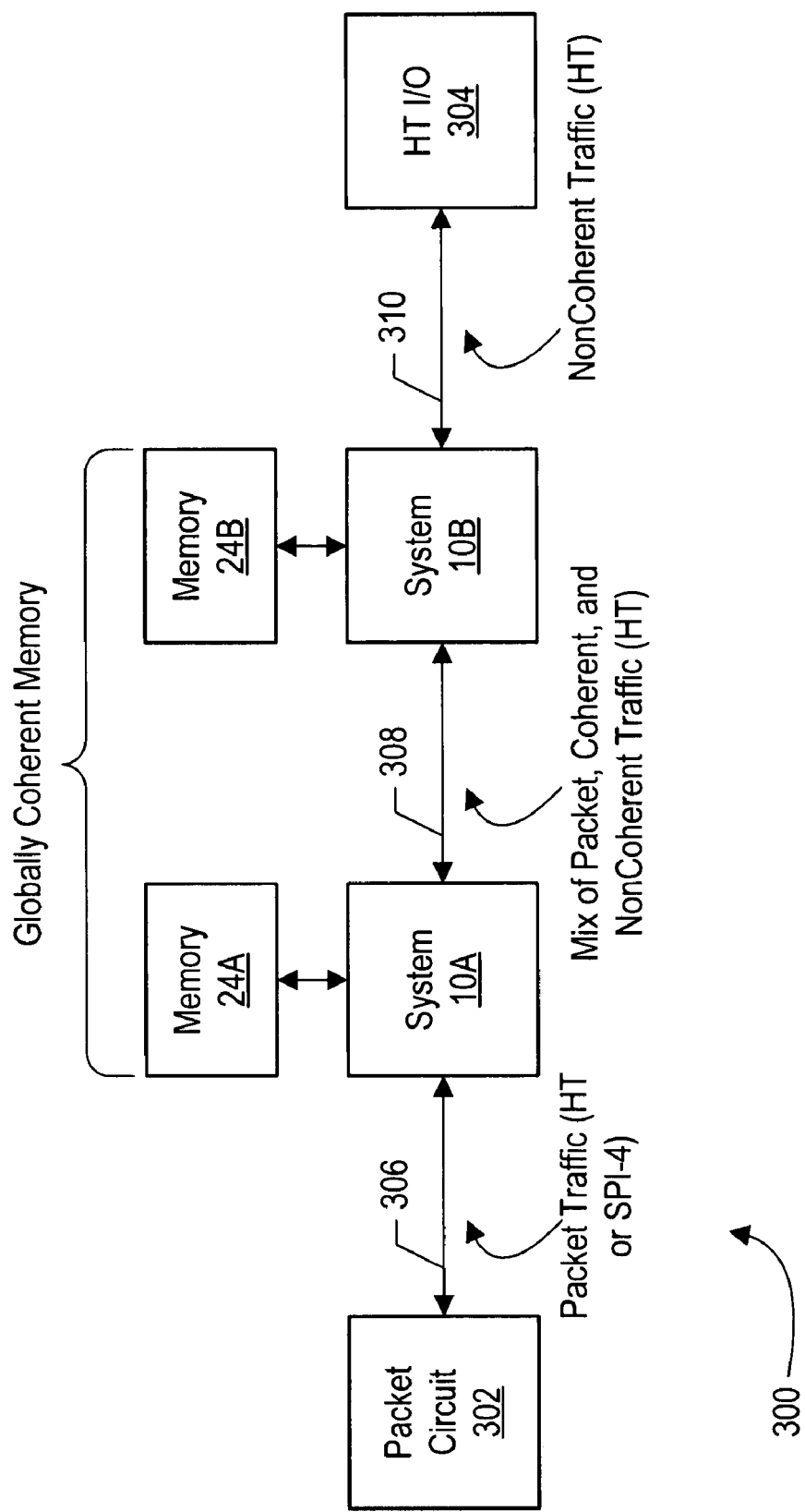
FIG. 2 is a block diagram of one embodiment of a packet processing system including two (or more) of the systems shown in FIG. 1.

Turning now to FIG. 2, a block diagram of one embodiment of a packet processing system 300 is shown. In the embodiment of FIG. 2, the packet processing system 300 includes two instantiations of the system 10 shown in FIG. 1 (systems 10A and 10B in FIG. 2). Each system 10A and 10B is coupled to a respective memory 24 (memories 24A and 24B in FIG. 2) which may form a globally coherent memory using coherency commands between the systems 10A and 10B. The packet processing system 300 further includes a packet circuit 302 and an input/output (I/O) circuit 304. The packet circuit 302 is coupled to the system 10A via an interface 306. The systems 10A and 10B are coupled via an interface 308. The system 10B and the I/O circuit 304 are coupled via an interface 310. Each of the interfaces 306, 308, and 310 may be one of the interfaces 30A-30B on the corresponding system 10A or 10B.

In the embodiment of FIG. 2, the interface 306 may be a packet interface carrying packet traffic between the packet circuit 302 and the system 10A. Any of the above mentioned packet interfaces may be used. In one particular embodiment, for example, the interface 306 may be a HT interface (using the PoHT extension) or the SPI-4 interface, as desired. As used herein, a packet circuit includes any circuit which sources and/or receives packets. For example, the packet circuit 302 may be a media access control (MAC) circuit having a SPI-4 or HT packet interface. The packet circuit 302 may further comprise switches, routers, gateways, etc.

In the embodiment of FIG. 2, the interface 310 may be any interface capable of carrying noncoherent traffic. For example, any peripheral interface may be used (e.g. peripheral component interconnect (PCI), universal serial bus (USB), firewire, etc.). In one particular embodiment, the HT interface is used for the interface 310. The interface 310 may carry commands for communicating with various I/O circuits such as I/O circuit 304. Generally, an I/O circuit may be any device which communicates as a peripheral to the packet processing system 300. For example, an I/O circuit 304 may be a bridge to one or more I/O interfaces (e.g. PCI, USB, etc.), an I/O device, etc.

In the embodiment of FIG. 2, the interface 308 may be any interface capable of carrying a mix of packet, coherent, and noncoherent traffic. In one embodiment, for example, the interface 308 may be an HT interface (using the PoHT extension for packet traffic and the HTcc extension for coherency commands). The use of an interface 308 which carries a mix of packet, coherent, and noncoherent traffic may permit efficiency and scalability in the packet processing system 300, in some embodiments. Since the three types of traffic may be carried on the same interface, each system 10 included in the packet processing system may communicate with another system 10 efficiently (e.g. using one interface). Furthermore, the system may be scalable to more systems 10. Coherency may be used to permit any system 10 to access any memory location, local or remote.

Packet traffic between the systems 10 may be used to route packets among the systems for processing, balancing the processing load among the systems 10. Additionally, packet traffic between the systems 10 may be used to route a packet from one system 10 through one or more other systems 10 to a packet circuit. That is, any system 10 may transmit a packet to a packet circuit coupled to any other system 10. Similarly, noncoherent traffic may be used to allow any system 10 to communicate with any I/O circuit.

While two systems 10A and 10B are illustrated in the packet processing system 300 of FIG. 2, other embodiments may include more than two systems 10. Each system 10 may be coupled to at least one other system 10 via an interface that is capable of carrying a mix of packet, coherent, and noncoherent traffic. Similarly, other systems may include more packet circuits and/or I/O circuits, as desired.

Figure 3:
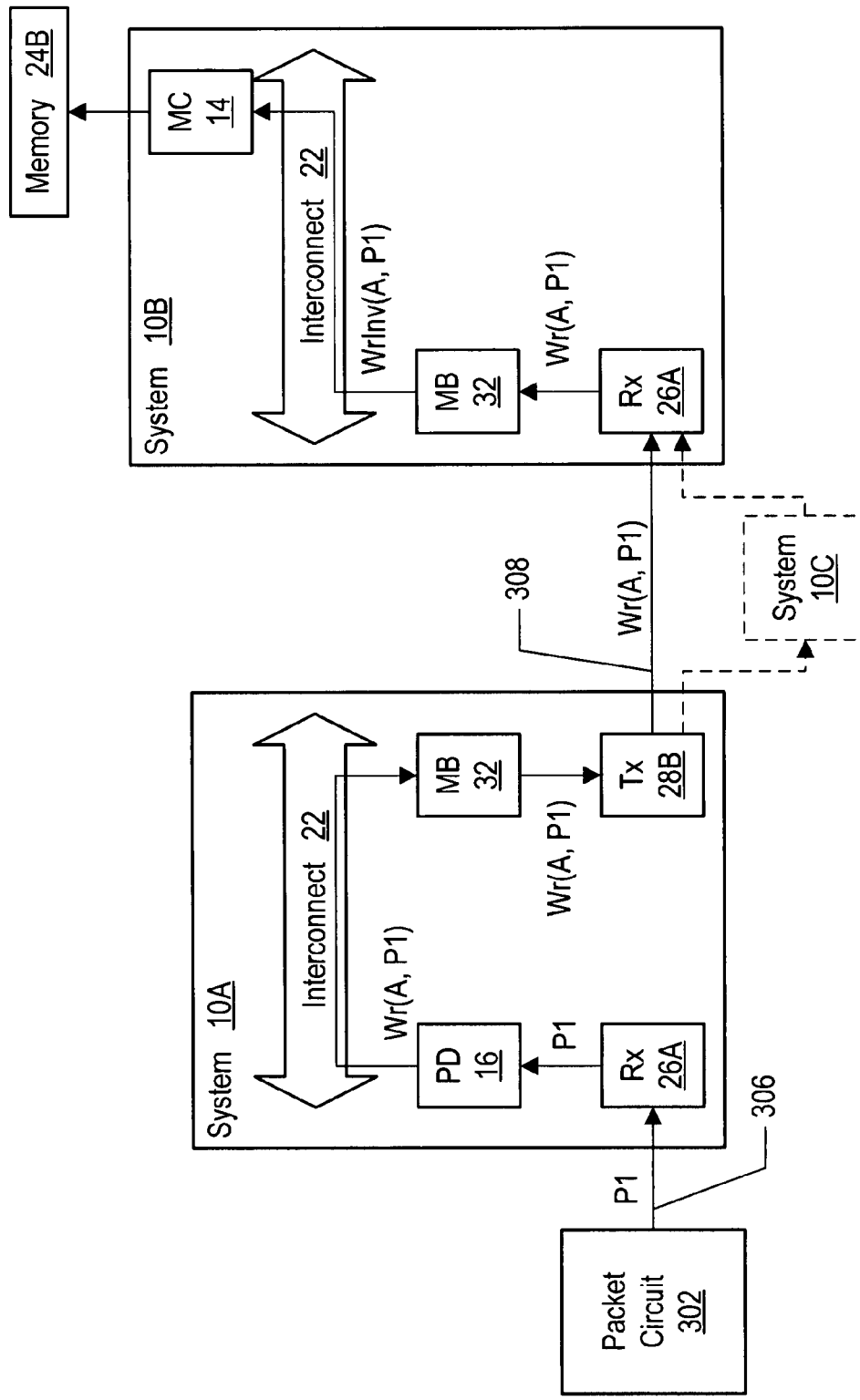
FIG. 3 is a block diagram of a first example of communication in the packet processing system shown in FIG. 2.

FIG. 3 is an example of the packet processing system 300 in which a combination of the coherency, noncoherent, and packet features of the systems 10 are used to store a packet in a memory coupled to a system 10 which is remote to the system 10 that is coupled to the packet circuit 302 that sources the packet. In the example of FIG. 3, a packet P1 is shown. The packet circuit 302 transmits the packet P1 on the interface 306 to the system 10A (specifically, the Rx circuit 26A receives the packet P1). The Rx circuit 26A may use one or more packet attributes of the packet P1 to determine that the packet P1 is to be transmitted to the packet DMA circuit 16.

The packet DMA circuit 16 in the system 10A receives the packet P1, and generates one or more write transactions on the interconnect 22 to write the packet P1 to memory. Each write transaction may transfer a cache block of data in this embodiment, and thus the number of write transactions may be dependent on the number of cache blocks in the packet (and the alignment of the packet in memory). The transactions may be noncoherent write transactions (Wr), and thus the coherent agents in the system 10A may take no action with regard to the write transactions. In this example, the packet DMA circuit 16 in the system 10A is programmed to write the packet P1 to a memory address "A" which identifies a memory location in the memory 24B coupled to the system 10B. For example, the packet DMA circuit 16 may be programmed via a set of descriptor rings described in more detail below. Any mechanism for programming the packet DMA circuit 16 with addresses for storing packets may be used.

The memory bridge 32 in the system 10A detects the write transactions to the address A (a remote address for the system 10A) and generates corresponding noncoherent write commands (e.g. standard HT write commands) to transmit the cache blocks to the system 10B. The memory bridge 32 transmits the write commands to the Tx circuit 28B in the system 10A (responsive, e.g., to a programmable address map in the memory bridge 32 which maps the address A to the Tx circuit 28B). The Tx circuit 28B transmits the write commands on the interface 308 to the Rx circuit 26A in the system 10B, which routes the write commands to the memory bridge 32 in the system 10B. The Rx circuit 26A may detect that the write commands are to be routed to the memory bridge 32 in the system 10B (as opposed to a Tx circuit for routing to another system 10) by, e.g., comparing the node number of the system 10B (in the configuration register 38 in FIG. 1) to the address A. Additional details regarding the mapping of addresses to nodes in a coherent system for one embodiment are provided below.

The memory bridge 32 in the system 10B generates write transactions (e.g. WrInv) on the interconnect 22 in the system 10B in response to the coherency commands. Since the address A is local to the system 10B, the memory controller 14 in the system 10B may receive the write transactions and write the data transmitted with the write transaction (the packet P1 data) to the memory 24B. It is noted that, if other nodes have copies of the cache blocks being written by the write transactions (as indicated by the remote line directory 34 in the system 10B), the memory bridge 32 in the system 10B may also generate probes to those nodes to invalidate those copies. That is, the WrInv transaction may be a coherent transaction that invalidates cached copies of the cache block updated by the WrInv transaction. The memory bridge 32 may generate a WrInv transaction responsive to the write command and further responsive to detecting that the write command is in the home node and updates the entire cache block. Thus, the write commands enter the coherent domain (i.e., they become coherent) in the home node (the system 10B in this example).

The combination of the coherency features, noncoherent features, and packet features of the system 10 are thus used, in the example of FIG. 3, to permit the packet DMA circuit 16 in the system 10A to serve as a remote DMA device to DMA packet data to the memory 24B. Thus, a packet DMA circuit 16 near the packet source may be used to store packets in any system 10 within the packet processing system 300. The operation illustrated in FIG. 3 may permit the packet processing load from the packet circuit 302 to be balanced among the systems 10 included in the packet processing system 300, for example. Also, using the features are shown in FIG. 3 may avoid performing reads of the affected data by the system 10A to permit coherent update of the cache blocks in the system 10A. By transmitting the data to the system 10B using noncoherent writes, a more efficient transfer may be performed.

It is noted that, in packet processing system 300 embodiments including more systems 10, the coherency commands may pass through one or more additional systems (e.g. the system 10C illustrated in dotted form in FIG. 3). The additional systems 10 (such as system 10C) may have packets written to memory coupled to those additional systems as well.

Figure 4:
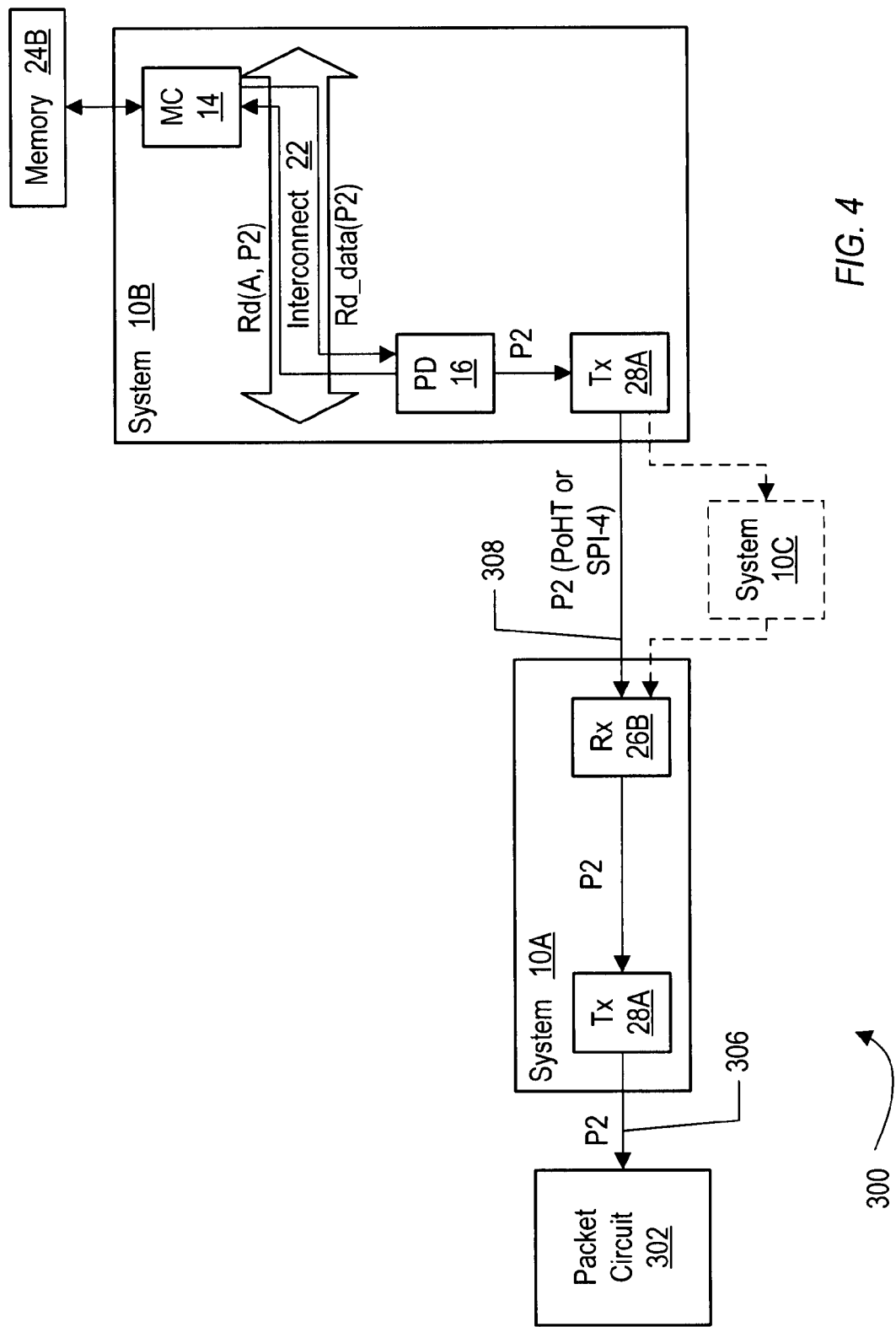
FIG. 4 is a block diagram of a second example of communication in the packet processing system shown in FIG. 2.

FIG. 4 is an example of the packet processing system 300 in which the packet features of the systems 10 are used to transmit a packet from a memory coupled to a system 10 to a packet circuit 302 that is coupled to another system 10. In the example of FIG. 4, a packet P2 is stored in the memory 24B (e.g. in a descriptor within a descriptor ring used as an output queue of the packet DMA circuit 16 in the system 10B). The packet DMA circuit 16 may detect that the packet P2 is ready for transmission (e.g. by the descriptor storing the packet being returned to the packet DMA circuit 16's control by software, or any other programmable mechanism). The packet DMA circuit 16 in the system 10B generates one or more read transactions on the interconnect 22 to read the packet from the memory 24B. The memory controller 14 in the system 10B may supply the read data for each transaction on the interconnect 22 in this example. However, since the read transaction is coherent in this embodiment, the read data may be sourced by any coherent agent 40 in the system 10B. If the read transaction is coherent in the global sense (e.g. internode coherent), the memory bridges 32 in the systems may become involved in the read transactions and the read data may be supplied from anywhere in the packet processing system 300.

The packet DMA circuit 16 in the system 10B may transmit the packet P2 to the Tx circuit 28A in the system 10B for transmission. In various embodiments, output queues of the packet DMA circuit 16 may be mapped to any desired Tx circuit 28A (and virtual channel at that Tx circuit 28A) in any desired fashion (e.g. a configuration register may map output queues to Tx circuits, or the mapping may be stored in descriptors for each packet, etc.). The Tx circuit 28A transmits the packet P2 on the interface 308 to the system 10A (particularly, to the Rx circuit 26B in the system 10A). In one embodiment, the packet P2 may be transmitted as one or more PoHT commands on the interface 308. In another embodiment, if desired, the interface 308 may be a SPI-4 interface if internode coherency is not used in the packet processing system 300.

The Rx circuit 26B in the system 10A may use one or more packet attributes of the P2 packet to determine that the packet is to be transmitted to the Tx circuit 28A in the system 10A. The Tx circuit 28A in the system 10A may then transmit the packet P2 on the interface 306 to the packet circuit 302.

The packet features of the system 10 are thus used, in the example of FIG. 4, to permit the packet DMA circuit 16 in the system 10B to serve as a remote DMA device to DMA packet data to the packet circuit 302. Thus, a packet DMA circuit 16 near the processors 12A-12N that generate packets (or process received packets and determine that the packets are to be forwarded) may be used to transmit packets to any packet circuit within the packet processing system 300 or coupled to the packet processing system 300.

It is noted that, in packet processing system 300 embodiments including more systems 10, the packet may pass through one or more additional systems (e.g. the system 10C illustrated in dotted form in FIG. 4). The additional systems 10 (such as system 10C) may have packets routed to those additional systems as well.

Figure 5:
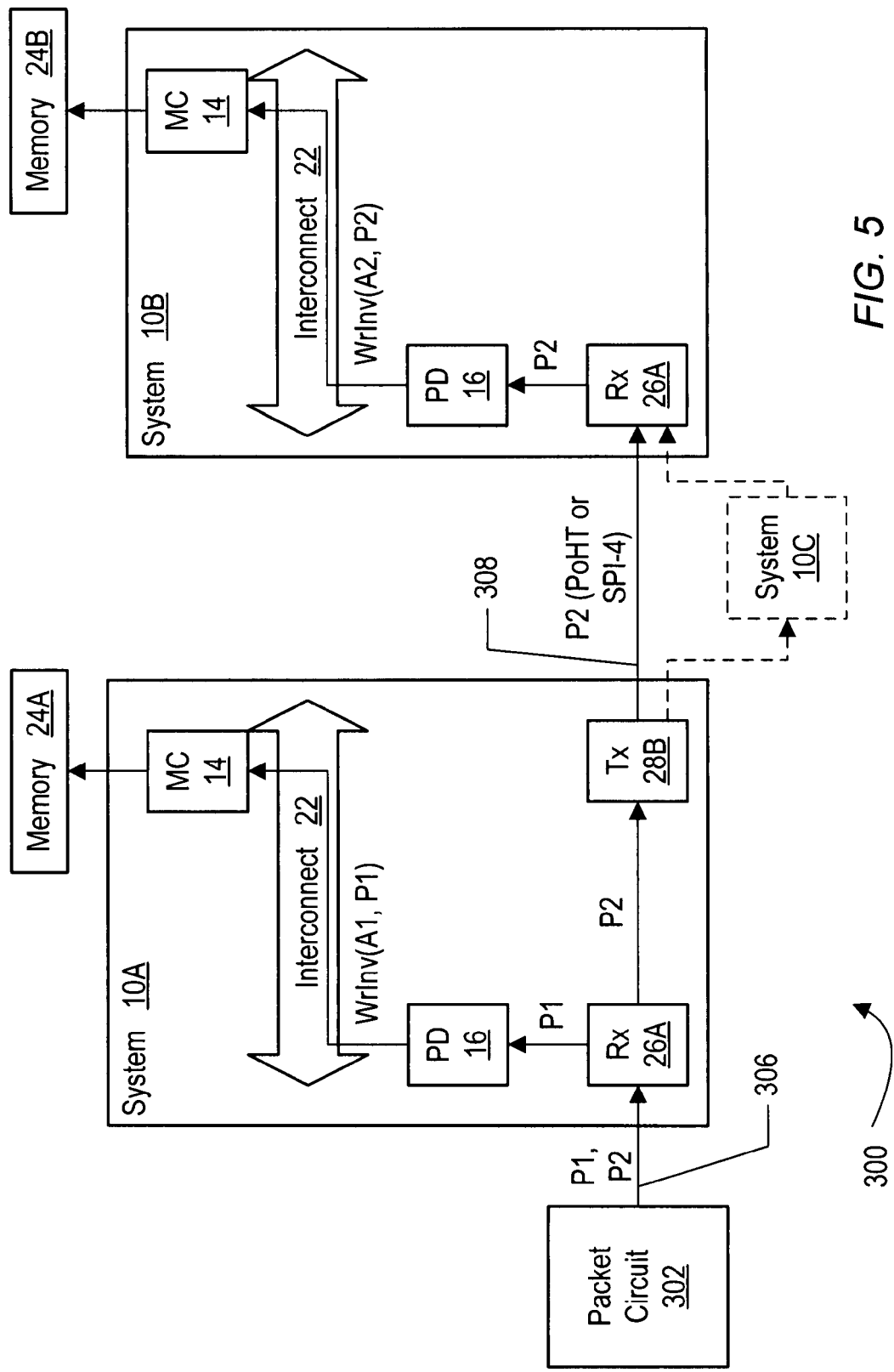
FIG. 5 is a block diagram of a third example of communication in the packet processing system shown in FIG. 2.

FIG. 5 is an example of the packet processing system 300 in which the packet features of the systems 10 are used to store received packets in any of the memories 24A-24B. In the example of FIG. 5, packets P1 and P2 are transmitted by the packet circuit 302 on the interface 306 to the Rx circuit 26A in the system 10A. Based on one or more packet attributes of the packet P1, the Rx circuit 26A determines that the packet P1 is to be transmitted to the packet DMA circuit 16 in the system 10A. Based on one or more packet attributes of the packet P2, the Rx circuit 26A determines that the packet P2 is to be transmitted to the Tx circuit 28B.

The packet DMA circuit 16 in the system 10A receives the packet P1 and generates one or more write transactions on the interconnect 22 in the system 10A. In this example, the packet DMA circuit 16 is programmed with a local address A1 for the packet P1 (an address that identifies a memory location in the memory 24A). The memory controller 14 receives the write transactions and updates the memory 24A. Additionally, the memory bridge 32 in the system 10A (not shown in FIG. 5) may invalidate any remote copies of the cache blocks updated by the write transactions (if the address A1 is an internode coherent address).

The Tx circuit 28B in the system 10A transmits the packet P2 on the interface 308 to the Rx circuit 26A in the system 10B. The Rx circuit 26A in the system 10B, responsive to one or more packet attributes of the packet P2, transmits the packet P2 to the packet DMA circuit 16 in the system 10B. Similar to the packet DMA circuit 16 in the system 10A, the packet DMA circuit 16 in the system 10B generates one or more write transactions on the interconnect 22 in the system 10B. The memory controller 14 in the system 10B receives the write transactions and updates the memory 24B with the packet P2.

The operation illustrated in FIG. 5 is another mechanism that may be used to balance the packet processing load from the packet circuit 302 among the systems 10 in the packet processing system 300. In this example, the input queues of the packet DMA circuits 16 in the systems 10A and 10B may be viewed as double the number of input queues available for packets from the packet circuit 302. For example, if each packet DMA circuit 16 supports up to 32 input queues, up to 64 input queues may be available for packets from the packet circuit 302. If additional systems 10 are included in the packet processing system 300, even more input queues may be made available.

It is noted that the remote DMA operation of FIG. 3 may be implemented in combination with the operation of FIG. 5. That is, some packets may be stored by a packet DMA circuit 16 in the memory local to the system 10 that includes that packet DMA circuit 16, other packets may be DMA'd to a remote memory through the memory bridges 32 in one or more systems 10 including the system 10 including that packet DMA circuit 16, and still other packets may be routed between systems 10 by the Rx circuits 26A-26C and Tx circuits 28A-28C in the systems 10.

It is noted that, in packet processing system 300 embodiments including more systems 10, the packet P2 may pass through one or more additional systems (e.g. the system 10C illustrated in dotted form in FIG. 5). The additional systems 10 (such as system 10C) may have packets routed to those additional systems as well.

Figure 5A:
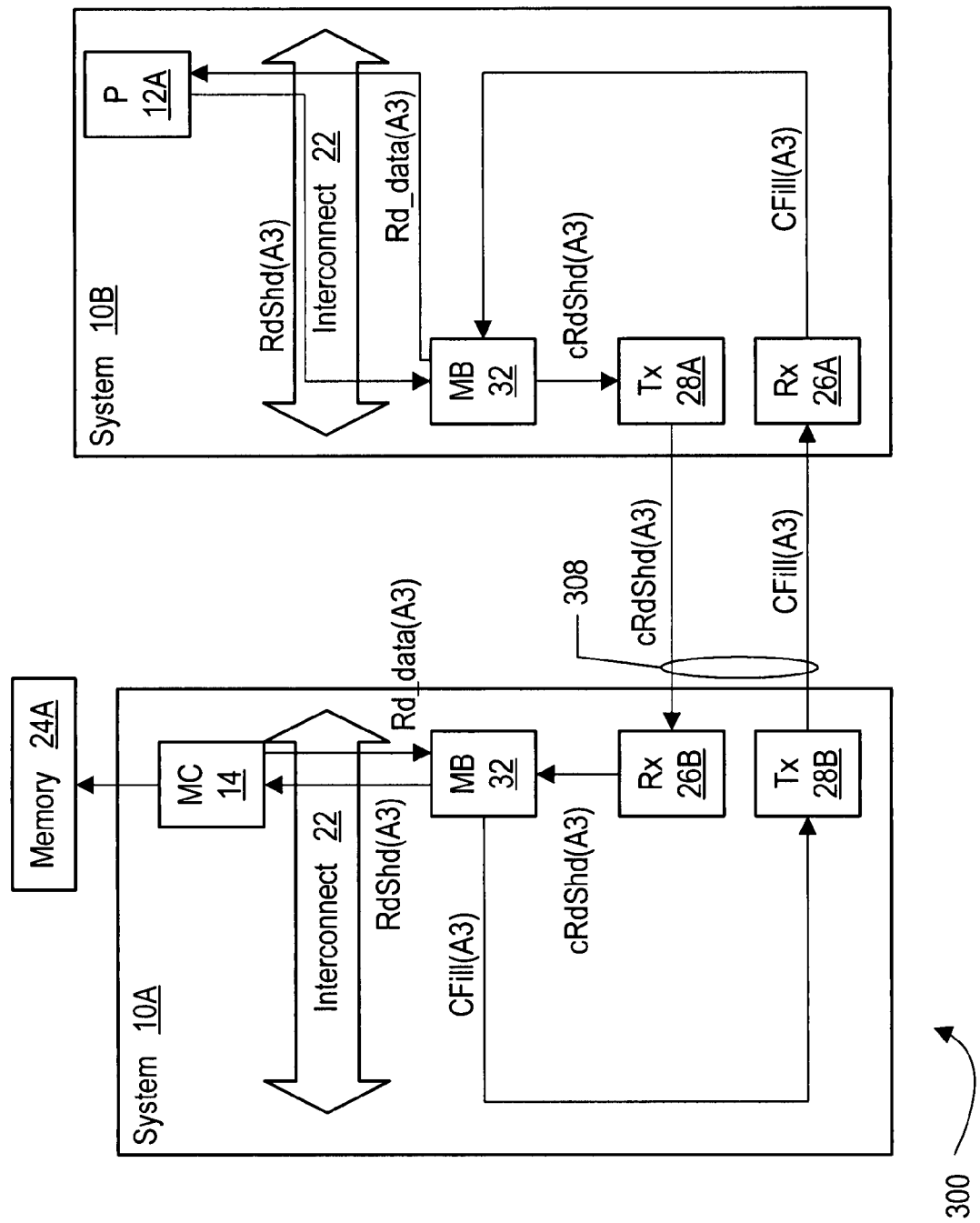
FIG. 5a is a block diagram of a fourth example of communication in the packet processing system shown in FIG. 2.

FIG. 5a is an example of the packet processing system 300 in which the coherency features of the systems 10 are used to permit coherent sharing of one or more cache blocks between the systems 10. For example, the system 10B may have received a packet from the system 10A (similar to the packet P2 in FIG. 5), and may access a shared data structure used to process the packet. The shared data structure may be routing table information, for example, or other packet data structures. Alternatively, in another example the packet P2 may be an iSCSI packet and the shared data structure may be a disk cache accessed in response to the iSCSI command. Thus, packets may be distributed among systems 10 (e.g. load balancing) and the data structures used to process the packets may be coherently shared among the systems 10. The data structures may be stored in any memory coupled to any system 10, and may be coherently accessed by any other system 10.

In the example of FIG. 5a, a processor 12A in system 10B may be processing a packet, and may generate a coherent read transaction (RdShd in FIG. 5a) to read an address A3. The address A3 may identify a memory location in the memory 24A. The memory bridge 32 in the system 10B may detect that the coherent read transaction, and may generate a corresponding coherent read shared command (cRdShd). The memory bridge 32 may transmit the cRdShd command to the Tx circuit 28A in the system 10B, which transmits the command on the interface 308 (illustrated as two unidirectional links in FIG. 5a). The Rx circuit 26B in the system 10A receives the cRdShd command, and routes the command to the memory bridge 32 in the system 10A. The memory bridge 32 in the system 10A generates a RdShd transaction on the interconnect 22 in the system 10A.

The memory controller 14 in the system 10A receives the RdShd transaction and supplies corresponding read data (Rd_Data(A3) in FIG. 5a) to the memory bridge 32. Alternatively, since the RdShd transaction is coherent, a coherent agent in the system 10A may supply the read data if the coherent agent has, e.g., a modified copy of the data. Additionally, the memory bridge 32 may generate probes to other systems 10 if a remote cached copy of the data exists (not shown in FIG. 5a). One of the other systems 10 may return the data to the system 10A in response to the probe if that system 10 has the data modified. Thus, a remote system may supply the data for the RdShd transaction. In any case, the data may be coherent provided.

The memory bridge 32 in the system 10A generates a coherent fill (CFill) command to transmit the read data back to the system 10B. The memory bridge 32 transmits the CFill command to the Tx circuit 28B in the system 10A, which transmits the CFill command across the interface 308 to the Rx circuit 26A in the system 10B. The Rx circuit 26A in the system 10B supplies the CFill command to the memory bridge 32 in the system 10B, which supplies read data (Rd_Data) on the interconnect 22 to the processor 12A in the system 10B.

It is noted that, in packet processing system 300 embodiments including more systems 10, the cRdShd command may pass through one or more additional systems (not shown in FIG. 5a). The CFill may similarly pass through one or more additional systems, and may follow a different path through the system than the cRdShd command, in some embodiments.

Figure 6:
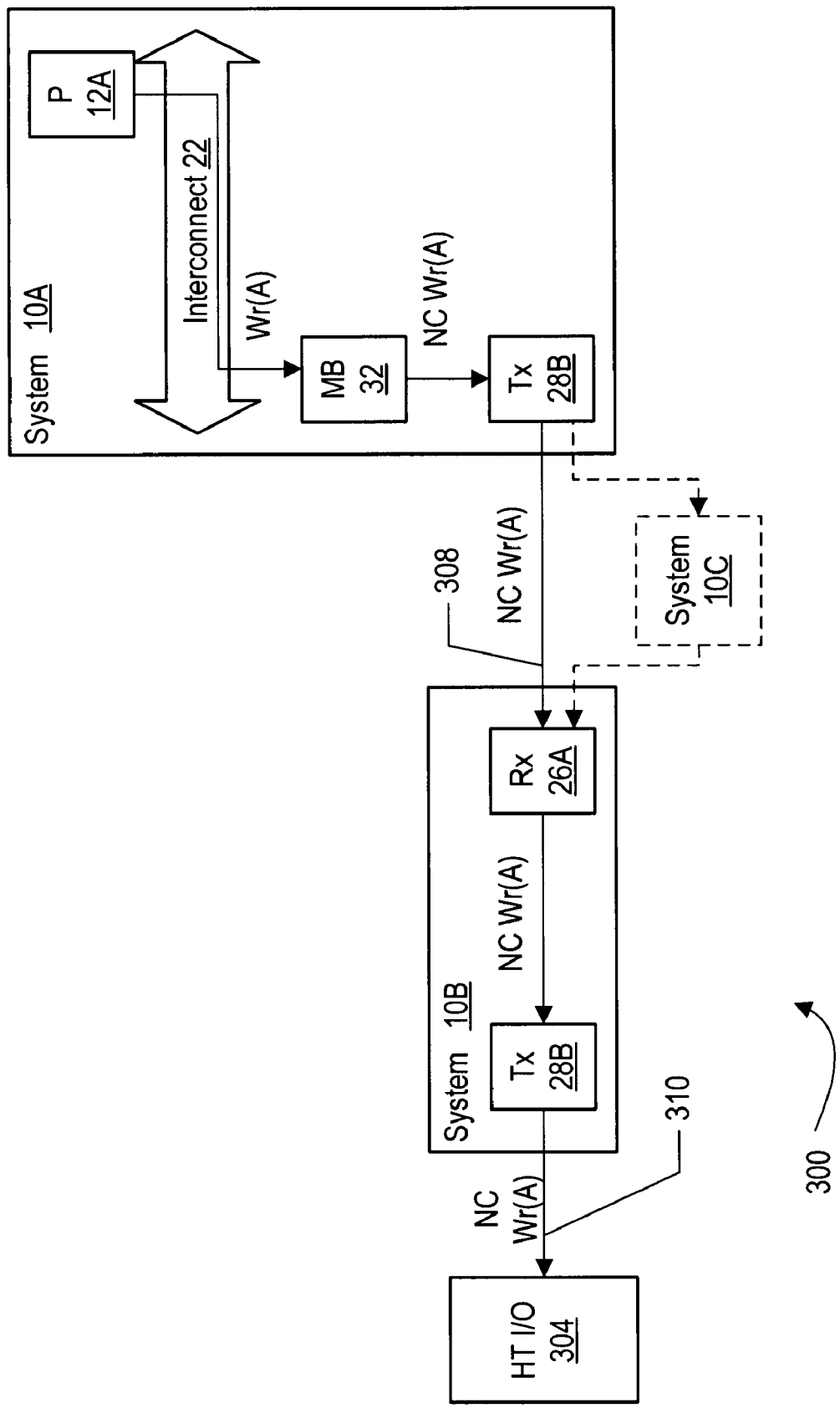
FIG. 6 is a block diagram of a fifth example of communication in the packet processing system shown in FIG. 2.

FIG. 6 is an example of the packet processing system 300 in which the noncoherent features of the systems 10 are used to permit a processor 12A in the system 10A to transmit a noncoherent write to an I/O circuit 304. In the example of FIG. 6, the processor 12A transmits a write transaction on the interconnect 22. The write transaction may be to an address "A" that is mapped to the I/O circuit 304, or may be a transaction type that indicates the transaction is to an I/O circuit. The memory bridge 32 in the system 10A detects the noncoherent write, and generates a noncoherent command (NC WR(A) in FIG. 6). The memory bridge 32 determines (e.g. via a programmable address map or other programmable mechanisms) that the noncoherent command is to be transmitted to the Tx circuit 28B.

The Tx circuit 28B transmits the noncoherent command on the interface 308 (e.g. as a standard HT command). The Rx circuit 28A in the system 10B receives the noncoherent write, and determines that the noncoherent write is to be transmitted to the Tx circuit 28B in the system 10B (e.g. according to standard HT routing mechanisms). The Tx circuit 28B transmits the noncoherent command on the interface 310 to the I/O circuit 304.

The operation similar to FIG. 6 may permit any processor in any system 10 within the packet processing system 300 to communicate with any I/O circuit 304 connected to any system 10. Read operation may be similar to that shown in FIG. 6, with data being returned along the same path that the read command takes (or a different path, if additional systems 10 are included).

In some embodiments, the systems 10 may include other I/O interfaces (e.g. PCI, USB, etc.) that may be reached via one or more I/O interface circuits coupled to the interconnect 22 of a system 10 or through a bridge to the interconnect 22. In such systems, noncoherent reads and writes may be routed from a processor in any system 10 to a system 10 coupled to a desired I/O circuit via one of the I/O interfaces, and that system 10 may route the noncoherent command to the memory bridge 32 in that system 10. The memory bridge 32 may generate a write transaction on the interconnect 22 and the I/O interface circuit (or bridge) may receive the write transaction for routing to the desired I/O circuit.

It is noted that, in packet processing system 300 embodiments including more systems 10, the noncoherent command may pass through one or more additional systems (e.g. the system 10C illustrated in dotted form in FIG. 6). The additional systems 10 (such as system 10C) may have noncoherent commands routed to those additional systems as well.

FIGS. 3-6 illustrate various individual examples of using the various traffic types supported between the systems 10. Generally, the examples of FIGS. 3-6 may be used, in various combinations, concurrently if the interface 308 (or interfaces between each system 10, when additional systems 10 are included) supports the mix of coherent, packet, and noncoherent traffic as illustrated in FIG. 2.

Packet Virtual Channels

Figure 7:
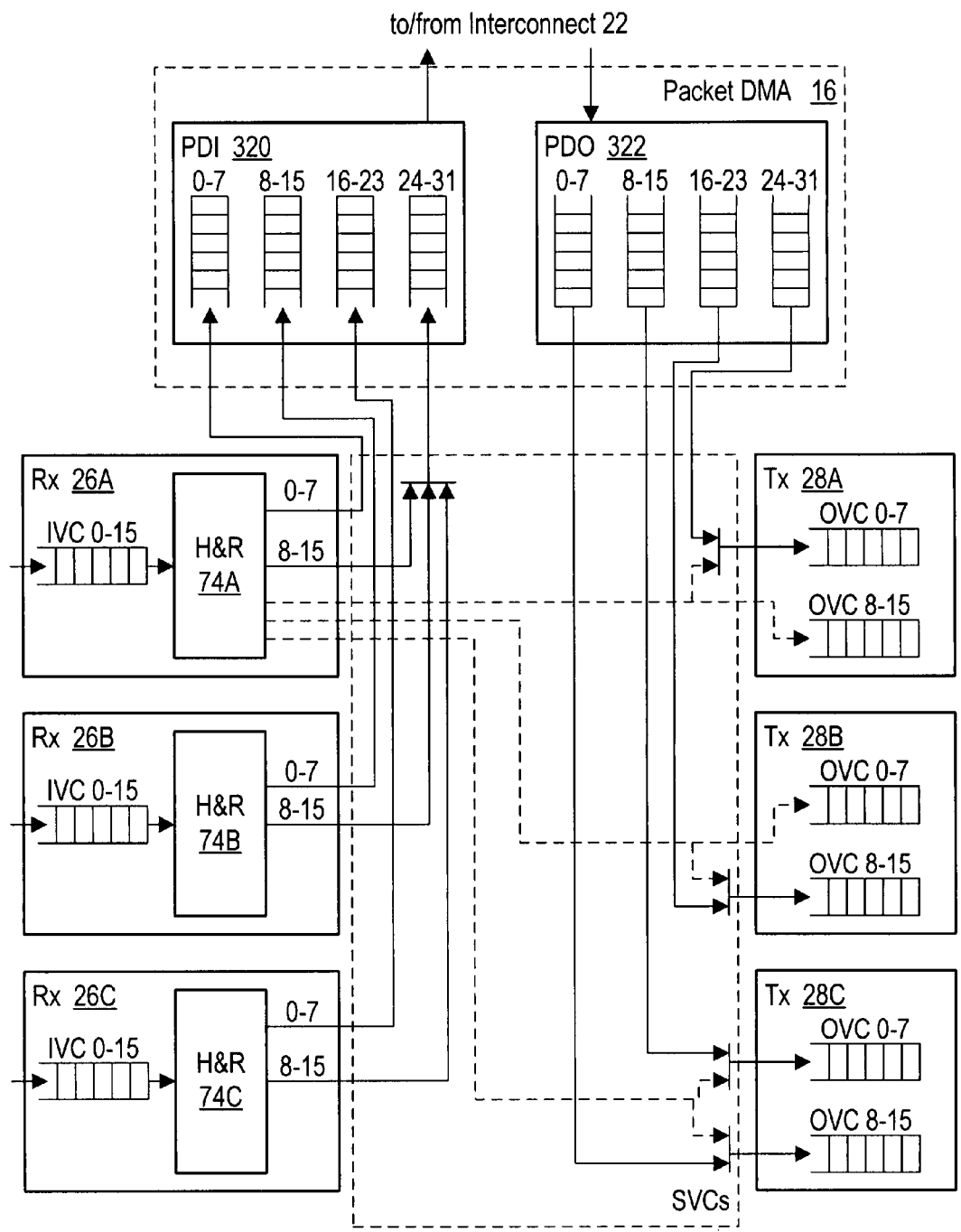
FIG. 7 is a block diagram illustrating one embodiment of virtual channels in the integrated circuit of FIG. 1.

Turning now to FIG. 7, a block diagram illustrating one embodiment of packet virtual channels in the system 10 is shown. In the illustrated embodiment, the Rx circuits 26A-26C and the Tx circuits 28A-28C are shown. Additionally, the packet DMA circuit is 16 is shown as including an input packet DMA circuit (PDI) 320 and an output packet DMA circuit (PDO) 322. The PDI 320 is coupled to transmit write transactions on the interconnect 22 to write received packets to memory. The PDO 322 is coupled to transmit read transactions on the interconnect 22 and to receive the read data comprising packets to be transmitted from the system 10.

Each Rx circuit 26A-26C supports a set of input virtual channels (IVCs) defined by the interface from which the Rx circuit receives packet data. For example, the SPI-4 interface and the HT interface may both support 16 virtual channels in hardware (although more may be used by software in the SPI-4 interface, since an 8 bit virtual channel value is supported). Thus, each Rx circuit 26A-26C supports 16 IVCs (numbered 0-15 in FIG. 7). Similarly, each Tx circuit 28A-28C supports 16 output virtual channels (OVCs), numbered 0-15 in FIG. 7. Other embodiments may employ more or fewer IVCs and OVCs according to the interfaces supported by those embodiments. The PDI 320 includes a logical set of input queues (e.g. 32 in the illustrated embodiment, numbered 0-31, although more or fewer input queues may be included in other embodiments). The PDO 322 includes a logical set of output queues (e.g. 32 in the illustrated embodiment, numbered 0-31, although more or fewer output queues may be included in other embodiments).

Each Rx circuit 26A-26C includes a hash and route (H&R) circuit 74A-74C in the illustrated embodiment, which maps packets from the IVCs to a switch virtual channel (SVC). The SVC is used as the internal virtual channel for the system 10, and in particular is used to transmit packets through the switch 18 to the packet DMA circuit 16 or to the Tx circuits 28A-28C. Viewed in another way, requests to transmit packet data through the switch 18 are made based on the SVC of the packet, which identifies both the destination of the packet (e.g. the PDO 320 or one of the Tx circuits 28A-28C) and the virtual channel at the destination. The SVC may also be referred to herein as a destination and the virtual channel at the destination.

In the illustrated embodiment, the H&R circuits 74A-74C may map the IVCs to one of 16 PDI VCs (numbered 0-15 in FIG. 7, using solid lines from the H&R circuits 74A-74C). These PDI VCs may be further mapped to input queues in the PDI 320, e.g. using a register to which the H&R circuits 74A-74C is coupled (see FIG. 8 below). That is, VCs at the PDI 320 may correspond directly to input queues, or input queues may each be a VC in the PDI 320. In the illustrated embodiment, PDI VCs are mapped to input queues in blocks of eight (e.g. PDI VC 0 is either input queue 0, 8, 16, or 24; PDI VC 1 is either input queue 1, 9, 17, or 25; etc.). In other embodiments, each PDI VC may be individually mappable to an input queue, or other sized blocks of input queues may be mappable to PDI VCs. In yet another embodiment, the H&R circuits 74A-74C may directly map IVCs to PDI input queues (e.g. without the intermediate step of PDI VCs). Additionally, the H&R circuits 74A-74C may map packets from an IVC to an OVC in one of the Tx circuits 28A-28C, illustrated for H&R block 74A with dashed lines through the SVCs block to the Tx circuits 28A-28C.

The H&R circuits 74A-74C may be used to split packets from the same IVC to different SVCs (e.g. different input queues in the PDI and/or OVCs in the Tx circuits 28A-28C). Thus, the H&R circuits 74A-74C may provide software flexibility to separate packets for processing versus packets to be passed through the Tx circuits 28A-28C based on various packet attributes (such as header values or IVCs), or may provide for separating packets into different input queues in the PDI 320 (e.g. for different types of processing) based on various packet attributes. The H&R circuits 74A-74C may also be programmed to map IVCs to SVCs without using any additional packet attributes, or a combination of such mappings and other mappings using additional packet attributes, as desired. In other embodiments, the Rx circuits 26A-26B may not include H&R circuits and may instead use a programmable or fixed mapping of each IVC to a specified SVC (Tx circuit 28A-28C and OVC in that circuit or PDI 320 and an input queue in the PDI 320). It is noted that packets which are routed from an Rx circuit 26A-26C directly to a Tx circuit 26A-26C bypass the packet DMA circuit 16, the memory 24, and processing by the processors 12A-12N.

The PDO 322 output queues are also mapped to various Tx circuits 28A-28C and to OVCs in those Tx circuits 28A-28C. In the illustrated embodiment, output queues are mapped to Tx circuits and OVCs in blocks of 8, similar to the mapping of IVCs to input queues. Other embodiments may map output queues individually, or in other-sized blocks, as desired. In one embodiment, the PDO 322 includes a configuration register or registers programmed with the mapping of each block of 8 output queues to a corresponding group of SVCs (which identify the Tx circuit 28A-28C and the OVC within that Tx circuit). Other embodiments may use more elaborate mapping mechanisms similar to H&R circuits, to map packets based on packet attributes in addition to output queues, if desired.

FIG. 7 illustrates, via the solid arrows between the H&R circuits 74A-74C and the PDI 320, an exemplary mapping from the PDI VCs of the H&R circuits 74A-74C to the input queues of the PDI 320. The exemplary mapping is but one example of the mappings that may be used, as programmed into the Rx circuits 26A-26C by software. In the example, PDI VCs 0-7 from the H&R circuit 74A are mapped to input queues 0-7; PDI VCs 0-7 from the H&R circuit 74B are mapped to input queues 8-15; PDI VCs 0-7 from the H&R circuit 74C are mapped to input queues 16-23; and PDI VCs 8-15 from each of the H&R circuits 74A-74C are merged to input queues 24-31. When mappings merge the PDI VCs from different H&R circuits 74A-74C, the switch 18 may perform the merging on packet boundaries. That is, when a given Rx circuit 26A-26C has been granted to transfer a packet to an input queue that is merged among the Rx circuits 26A-26C, the switch inhibits granting any other Rx circuit 26A-26C on that input queue until the granted Rx circuit 26A-26C reaches a packet boundary. Any combination of PDI VCs from different Rx circuits 26A-26C may be merged into input queues, as desired in various mappings.

FIG. 7 also illustrates, via the solid arrows between the PDO 322 and the Tx circuits 28A-28C, an exemplary mapping of output queues to Tx circuits and OVCs. The exemplary mapping is but one example of mappings that may be used, as programmed by software. In the illustrated mapping, output queues 0-7 are mapped to OVCs 8-15 in the Tx circuit 28C; output queues 8-15 are mapped to OVCs 0-7 in the Tx circuit 28C; output queues 16-23 are mapped to OVCs 8-15 in the Tx circuit 28B; and output queues 24-31 are mapped to OVCs 0-7 in the Tx circuit 28A. Additionally, Rx circuits 26A-26C may map IVCs to OVCs, and thus there may be merging of packets from Rx circuits 26A-26C and output queues to an OVC. Again, the switch 18 may handle this merging on packet boundaries.

The input queues of the PDI 320 and the output queues of the PDO 322 may be logical queues. That is, the queues may actually be implemented in memory 24. The PDI 320 and the PDO 322 may include buffers to buffer the packet data being transmitted to and from the memory 24. The queues may be implemented in any fashion. In one particular embodiment, each queue is implemented as a descriptor ring which identifies memory buffers to store packet data corresponding to a given input queue. In other embodiments, the queues may be implemented in any desired fashion (e.g. contiguous memory locations, etc.).

It is noted that, while the Rx circuits 26A-26C and the Tx circuits 28A-28C are described with respect to FIG. 7 as supporting various packet virtual channels for packets, these circuits also support coherent virtual channels for the coherent traffic and noncoherent virtual channels for the noncoherent traffic. The coherent virtual channels may flow to the memory bridge 32, or to a Tx circuit 28A-28C, based on a comparison of the node number in the configuration register 38 and the address of the coherency command to be transmitted. Similarly, the noncoherent virtual channels may flow to the memory bridge 32 and the Tx circuits 28A-28C.

Rx Circuit

Figure 8:
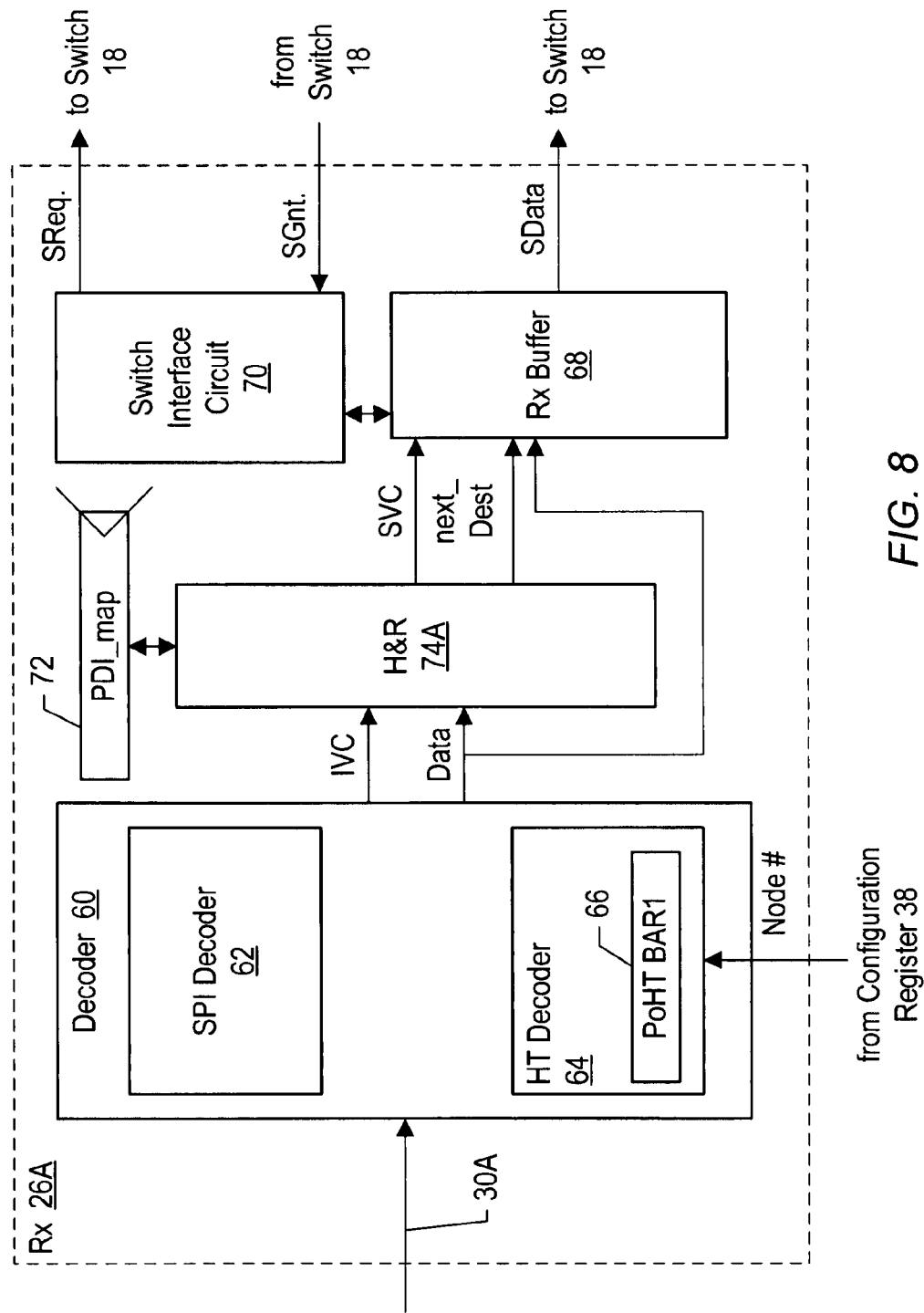
FIG. 8 is a block diagram of one embodiment of an Rx circuit shown in FIG. 1.

Turning next to FIG. 8, a more detailed diagram of a portion of one embodiment of the Rx circuit 26A is shown. Other Rx circuits 26B-26C may be similar. In the embodiment of FIG. 8, the Rx circuit 26A includes a decoder 60 (which includes a SPI decoder 62 and an HT decoder 64 including a PoHT BAR1 register 66), a hash and route (H&R) circuit 74A, an Rx buffer 68, a switch interface circuit 70, and a PDI_map register 72. The decoder 60 is coupled to receive input data on the interface 30A, and is coupled to provide an input virtual channel (IVC) and the data to the H&R circuit 74A (if the data is packet data). The decoder 60 is also coupled to provide the data to the Rx buffer 68 for storage. The H&R block 74A is configured to generate a switch virtual channel (SVC) and optionally a next destination (next_dest) value, which are received by the Rx buffer 68. The Rx Buffer 68 is coupled to the switch 18 (particularly the source data path (Sdata in FIG. 8) of the switch 18) and is coupled to the switch interface circuit 70. The hash and route circuit 74A is coupled to the PDI_Map register 72 as well. The IVC may be the virtual channel on the interface 30A, and the SVC indicates the destination (within the system 10) and the virtual channel at the destination.

The decoder 60 receives the input data from the interface 30A and decodes the data according to the SPI specification (in the SPI decoder 62) or the HT specification (in the HT decoder 64). One of the decoders 62 and 64 is active dependent on which interface 30A the Rx circuit 26A is coupled to. The active decoder 62 or 64 may be selected in any desired fashion. The PoHT extension to the HT interface defines an address range (stored in the PoHT BAR1 register 66) to which HT sized-write commands may be directed in order to transmit packet data. The IVC may be carried in the sequence ID field of the HT packet, and the least significant bits of the address may indicate whether the data is the start of packet, middle of packet, or end of packet, the number of valid bytes in the last doubleword of the HT packet, and an error status. If an HT sized-write is decoded, and the address is in the address range indicated by the PoHT BAR1 register, the HT packet is a PoHT packet and the data transmitted with the sized write is packet data.

The HT decoder 64 may also decode coherency commands and noncoherent (e.g. standard HT) commands, and may output the IVC for these commands. The SVC may indicate the destination is the memory bridge 32 or one of the Tx circuits 28A-28C, and the virtual channel at the memory bridge 32/Tx circuit 28A-28C may be the same as the IVC.

Figure 9:
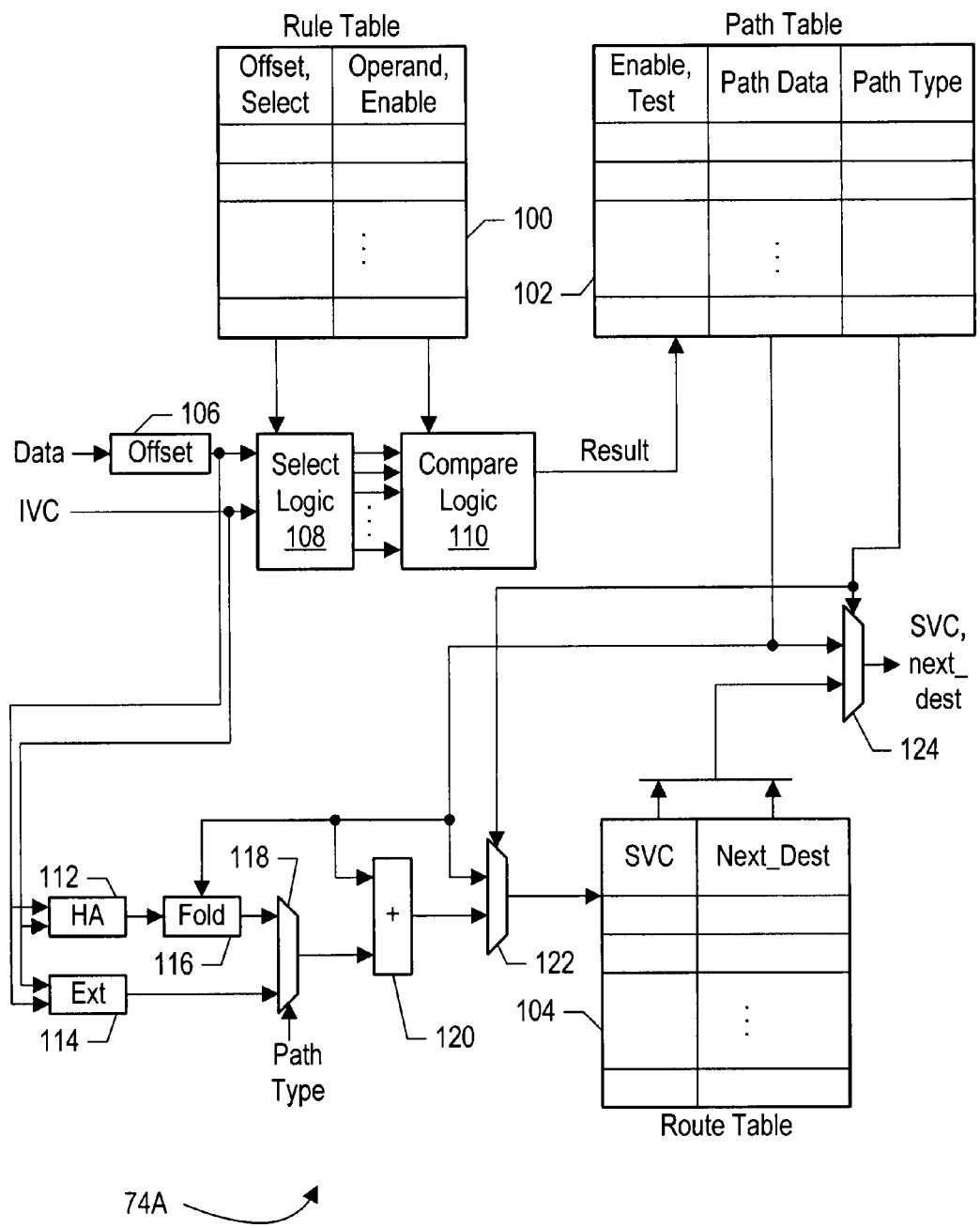
FIG. 9 is a block diagram of one embodiment of an H&R block shown in FIG. 8.

The decoder 60 provides the IVC of the packet and the received packet data to the H&R circuit 74A. The H&R circuit 74A may select bytes of the packet data and/or the IVC and generate a corresponding SVC. While the H&R circuit 74A may implement any hashing and mapping function, in one embodiment the H&R circuit 74A may be as shown in FIG. 9 and described below. Additionally, for HT interfaces, a next_dest may be output by the H&R circuit 74A. The next_dest value indicates, to a Tx circuit 28A-28C on an HT interface, which base address to select from a table of base addresses for the write command comprising the PoHT packet. If the SVC indicates the packet DMA circuit 16 is the destination, the H&R circuit may first determine a packet DMA circuit input (PDI) virtual channel (e.g. in a range of zero to fifteen) and then may map the PDI VC to an input queue of the packet DMA circuit (e.g. in a range of zero to 32) using the mapping specified in the PDI_map register 72.

The data and the SVC output by the H&R block 74A are stored in the Rx buffer 68. The Rx buffer 68 may include storage for each IVC, which may be programmably allocated to the IVCs using configuration registers (not shown).

The switch interface circuit 70 may scan the packets/commands stored in the Rx buffer 68 and generate requests for the switch 18 on the source request (SReq.) interface. When the switch 18 grants the request, the switch 18 indicates the grant on the source grant (SGnt.) interface.

In response to a grant, the switch interface circuit 70 may cause the Rx buffer 68 to transfer the next 16 bytes of the packet/command corresponding to the granted SVC. The Rx buffer 68 may free the storage from which the 16 bytes were read in response to transferring the data through the switch 18. It is noted that, while 16 bytes is used as an example above of one transfer through the switch 18, other embodiments may employ any size for the transfer.

Turning now to FIG. 9, a block diagram of one embodiment of the H&R circuit 74A is shown. H&R circuits in other Rx circuits 26B-26C may be similar. In the embodiment of FIG. 9, the H&R circuit 74A includes a rule table 100, a path table 102, a route table 104, an offset circuit 106, a select logic circuit 108, a compare logic circuit 110, a hash circuit 112, an extract circuit 114, a fold circuit 116, a multiplexor (mux) 118, an adder 120, a mux 122, and a mux 124. The offset circuit 106 is coupled to receive packet data and has an output coupled to the select logic circuit 108, the hash circuit 112, and the extract circuit 114. The IVC corresponding to the packet data is provided to the select logic circuit 108, the hash circuit 112, and the extract circuit 114. The select logic 108 is coupled to the rule table 100 and to the compare logic circuit 110, which is also coupled to the rule table 100 and to provide a result to the path table 102. The path table 102 is coupled to the muxes 118, 122, and 124, the adder 120, and the fold circuit 116. The mux 124 is coupled to the route table 104 and to provide the SVC and optionally next_dest output of the H&R circuit 74A. The route table 104 is coupled to receive an index from the mux 122, which is also coupled to the adder 120. The adder 120 is coupled to the mux 118, which is coupled to the fold circuit 116 and the extract circuit 114. The fold circuit 116 is coupled to the hash circuit 112.

In one embodiment, the H&R circuit 74A may support a number of programmable rules. Each rule selects bytes from the data (or the IVC) and compares the selected data to an operand of the rule. Each rule may be evaluated on packet data and the true/false results of each comparison may select one of a set of paths. The path may be an SVC, an index to a route table which outputs an SVC, or may select the output of a hash function or an extract function as the index to the route table (added to a base address which is also part of the path data). Additionally, for HT interfaces, the next_dest may be output.

Generally, the rule table 100, the path table 102, and the route table 104 may comprise memories which are programmable by software to generate SVCs for packets in accordance with the above. In one implementation, the entries of the rule table 100, the path table 102, and the route table 104 may be mapped into the address space of the system 10 as configuration registers which may be read and written by software.

Each entry of the rule table 100 includes an offset and select field, and an operand and enable field. The offset field specifies the offset of a word (4 bytes, in one embodiment) in the packet that is to be compared to the operand in the operand field. The enable field is a bit vector used to mask the selected word prior to the comparison. The select field selects either the word specified by the offset or the IVC for comparison. The select logic circuit 108 is coupled to receive the offset and select fields from each entry and is configured to select the specified data from the packet data or IVC for comparison. The select logic circuit 108 may select data independently for each entry and provide the data to the compare logic circuit 110. The compare logic circuit 110 may independently compare each selected data (masked by the enable field of the corresponding rule table entry) to the operand from the corresponding rule table entry. The results of the comparisons are provided to the path table 102. The results may include an indication of whether each comparison resulted in a true or false outcome. The number of entries in the rule table 100 may vary from embodiment to embodiment. In one implementation, there may be 16 rule entries allowing up to 16 programmable rules. In one embodiment, the offsets specified in the rule table are relative to a programmable offset from the beginning of the packet data. The offset circuit 106 may offset the packet data by the programmable offset. In one embodiment, the programmable offset may be direct (i.e. the programmed value may be the offset). In another embodiment, the programmable offset may be indirect (i.e. the programmed value may identify an offset field within the packet data that carries the offset for a given packet). In still another embodiment, the programmable offset may be programmable to be either direct or indirect.

The path table 102 may comprise a set of entries, each of which includes an enable and test field, a path data field, and a path type field. The enable and test field is used to program which results from the compare logic circuit 110 are used to determine if the path entry is used for this packet (via bits in the enable field corresponding to each result) and the test value may indicate whether the corresponding result is tested for true or false. If each enabled result tests the same as the test value specifies, the path table entry is selected. The path table 102 outputs the path data and path type fields from the selected path table entry. The path type field indicates one of several path types, controlling the muxes 118, 122, and 124 and indicating the nature of the path data. In an immediate path type, the SVC and optionally next_dest are specified in the path data. For the immediate path type, the mux 124 selects the path data through the mux 124. If the path type is not immediate, the output of the route table 104 is selected through the mux 124. Any number of path table entries may be supported in various embodiments, including different numbers of entries than the number of rule table entries. In one implementation, the path table 102 may include 16 entries and a 17$^{th}$ (default) entry that is selected if none of the other 16 entries match the result of the compare logic circuit 110.

The route table 104 includes several entries, each storing an SVC and a next_dest value. The route table 104 receives an index generated in several possible fashions depending on the path type field. If the path type is a index path type, the path data is an index into the route table 104 and the path data is selected through the mux 122. Otherwise, the output of the adder 120 is selected through the mux 122 as the index to the route table 104.

In the remaining path types, the path data may include a base address used (by adder 120) to generate the index of the route table. In a hash path type, the output of the hash circuit 112 (a hash value) is added to the base address to generate the index (and is selected through the mux 118 to the adder 120). The hash circuit 112 may be programmed to select up to 10 words from the packet data, mask the words with programmable enable vectors, and hash them to produce the hash value. In one embodiment, there are 512 entries in the route table 104. In such an embodiment, the hash function may generate an 8 bit hash value (which may be added to, e.g., a 9 bit base address in the adder 120). Additionally, in some embodiments, the path data may include a fold control which folds the hash value to a smaller value (e.g. programmably 7 bits or 6 bits in one embodiment) to reduce the portion of the route table 104 selectable via the hash circuit 112. In one implementation, the hash function bitwise XORs the upper two bytes and lower two bytes of each word to produce two bytes, then XORs adjacent sets of two bits to produce one byte (8 bits). The bytes of resulting from each word may be bitwise XOR'd to produce the hash value. The optional folding may XOR bits 7 and 5 of the hash value (numbering bits 7 to 0 from most significant to least significant) to produce bit 5 of the fold, zero bit 7, and provide the remaining hash value bits unmodified to produce a 7 bit fold, in one embodiment. To produce a 6 bit fold, one implementation may XOR bits 7 and 5 of the hash value to produce bit 5 of the fold, XOR bits 6 and 4 of the hash value to produce bit 4 of the fold, zero bits 7 and 6, and provide the remaining hash value bits unmodified to produce a 6 bit fold. If folding is not selected, the fold circuit 116 provides the unmodified hash value as the output. In other embodiments, two or more hash functions may be independently programmable in the hash circuit 112, and may be selected using the path type field.

The extract circuit 114 may be programmable to select two nibbles (4 bits) from the packet data to produce the 8 bit input to the adder 120. The two nibbles may be programmed independently and thus may be non-consecutive in the packet. In other embodiments, two or more extract functions may be programmed into the extract circuit 114 and selected using the path type field. In other embodiments, the extract result may be folded in a manner similar to the hash value.

While the embodiment of FIG. 9 provides a variety of mechanisms for generating an SVC, other embodiments may provide any subset of one or more of the direct SVC generation, the index from the path table to the route table, the hash mechanism, or the extract mechanism. Any size route table may be supported, and thus the hash value and extract result sizes may be varied.

Figure 10:
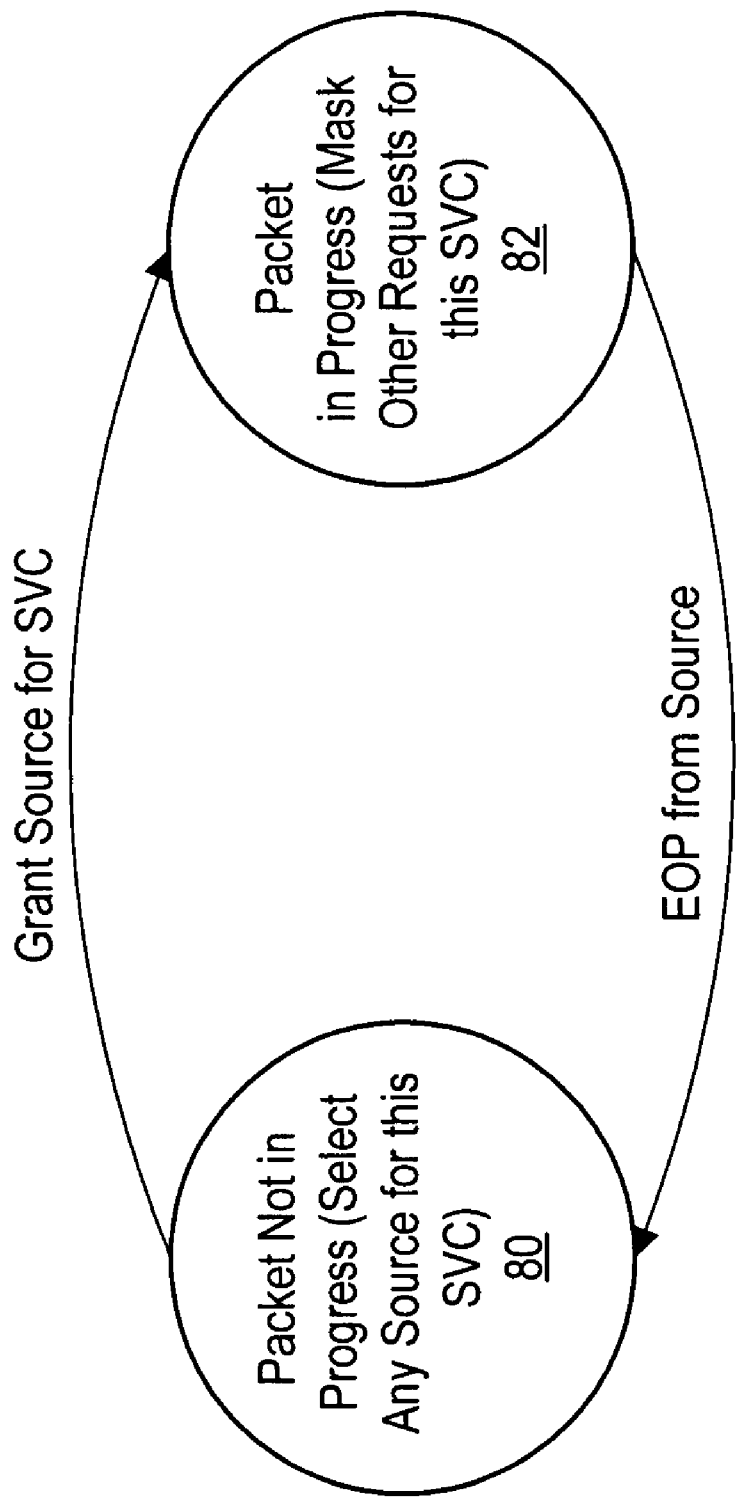
FIG. 10 is a state machine illustrating operation of one embodiment of the switch shown in FIG. 1.

Turning next to FIG. 10, a state machine diagram is shown which illustrates operation of one embodiment of the switch with respect to one SVC (one destination and virtual channel at that destination). A similar state machine may apply to each SVC.

In the packet not in progress state 80, the switch 18 may select any source to transfer data on the SVC. In state 80, the switch 18 may use any selection mechanism to select among requestors for the SVC. In one embodiment, the switch 18 uses a round robin selection scheme for the input queues of the packet DMA circuit 16 and the input buffers (on a virtual channel basis) of the memory bridge 32, and uses a programmable weighted round robin with priority scheme for the Tx circuits 28A-28C. In the programmable weighted round robin with priority scheme, each source may be programmed as high priority or low priority, and may be given a weight. In one implementation, the switch maintains deficit counters indicating how many transfers each source has not been able to transfer (based on its weight) on the SVC, and selects the requesting source with the highest deficit.

Once a source has been selected, the switch 18 transitions to the packet in progress state 82. In this state, the switch 18 records the source that was granted for this SVC and masks requests from other sources. Thus, the source that was previously granted is the only source that will be granted on the SVC. The switch may grant other sources for other SVCs corresponding to the same destination (e.g. other input queues in the packet DMA circuit 16, other virtual channel buffers in the memory bridge 32, or other output virtual channels (OVCs) in the Tx circuits 28A-28C). The switch 18 remains in this state until a request is granted to the source and the EOP indication with the request indicates end of packet. The switch 18 then transitions to the state 80 and selects the next source.

Packet DMA Circuit Descriptors

Figure 11:
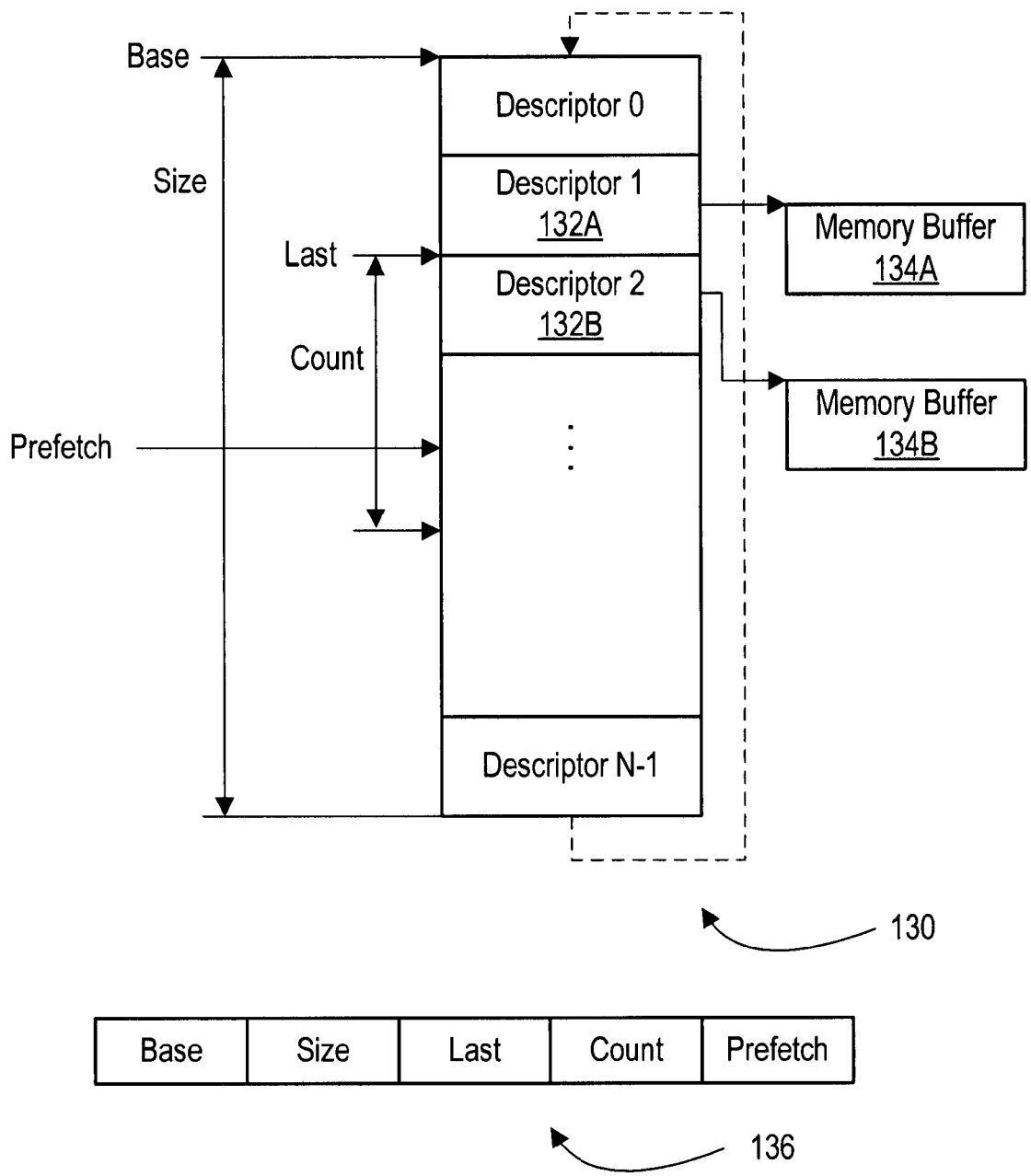
FIG. 11 is a block diagram of one embodiment of a descriptor ring which may be used by one embodiment of a packet DMA circuit shown in FIG. 1.

An exemplary descriptor ring 130 for the packet DMA circuit 16 is shown in FIG. 11, for one embodiment, along with a corresponding descriptor control register or registers 136. As mentioned above, a descriptor ring 130 may comprise an input queue (or an output queue) of the packet DMA circuit 16. Descriptor rings may be similar for both the input and output queues. In the embodiment of FIG. 11, the descriptors are stored in a memory region defined by the base address ("base" field of the registers 136 in FIG. 11) and the size ("size" field of the registers 136 in FIG. 11). The base address points to the first descriptor (descriptor 0) in memory, and the size is an offset to the end of the last descriptor (descriptor N-1). The descriptors may be used in a ring. That is, descriptors may be used in consecutive order starting at descriptor 0 and proceeding to descriptor N-1. When the last descriptor N-1 has been used, the next descriptor to be used in descriptor 0 (indicated in FIG. 11 by the dashed line from descriptor N-1 to descriptor 0).

Each descriptor points to a memory buffer (that is, the descriptor includes the address of the memory buffer), and may also include various attributes of the memory buffer. For example, in FIG. 11, the descriptor 132A points to the memory buffer 134A and the descriptor 132B points to the memory buffer 134B.

The descriptors are made available to the packet DMA circuit 16 by software. Once the packet DMA circuit 16 has used a descriptor to store a packet (or reads the packet from the descriptor for transmission), the packet DMA circuit 16 returns the descriptor to software. In one embodiment, the packet DMA circuit 16 returns a descriptor to software by resetting a hardware (HW) bit in the descriptor, described in more detail below. Software sets up the descriptors in the descriptor ring, and writes the number of descriptors being made available to the count corresponding to that descriptor ring ("count" field in the registers 136 in FIG. 11). The value written to the count field is added by the packet DMA circuit 16 to the value in the count field, resulting in the count of available descriptors. The "last" field in the registers 136 in FIG. 11 is an index, measured from the base address, to the last descriptor that was used by the packet DMA circuit 16 and returned to software. Thus, the descriptors beginning with the next descriptor in the ring after the descriptor indicated by the "last" field and the following "count"-1 number of descriptors are available for packet DMA circuit use.

In one embodiment, the packet DMA circuit 16 may prefetch one or more descriptors. The "prefetch" field of the registers 136 indicates the index, measured from the base address, of the most recently prefetched descriptor. Thus, the next descriptor to be prefetched may be the descriptor in the ring which follows the descriptor indicated by the prefetch field. Alternatively, the prefetch field may indicate the next descriptor to be prefetched. In one embodiment, the packet DMA circuit 16 does not attempt to prefetch a descriptor which has not been made available by software and thus the prefetch field may generally indicate a descriptor between the "last" descriptor and the descriptor corresponding to the "last" plus the "count".

Generally, once a descriptor becomes available for a given input queue, the packet DMA circuit 16 may request data from the switch (as a destination) for that input queue. Packet data received from the switch for the input queue is stored in the memory buffer indicated by the descriptor. A packet may be stored in one or more memory buffers. Once the memory buffer is full or the packet is complete, the packet DMA circuit 16 may update the descriptor to indicate availability of the packet and may return the descriptor to software.

Once a descriptor becomes available for a given output queue, the packet DMA circuit 16 may request transfers through the switch (as a source) to transfer the packet in the descriptor to the selected destination. Once the memory buffer has been emptied, the packet DMA circuit 16 may update the descriptor to return it to software.

In one embodiment, a descriptor 132 may be smaller, in size, than a cache block. For example, a cache block may be 32 bytes in size and the descriptor may be 16 bytes. In such cases, the packet DMA circuit 16 may be configured to delay a descriptor update (if the descriptor is in the lower half of the cache block) for a period of time to possibly pair the update with the update of the descriptor in the upper half of the cache block (due to the next packet). In such cases, a read-modify-write of the cache block may be avoided.

Figure 12:
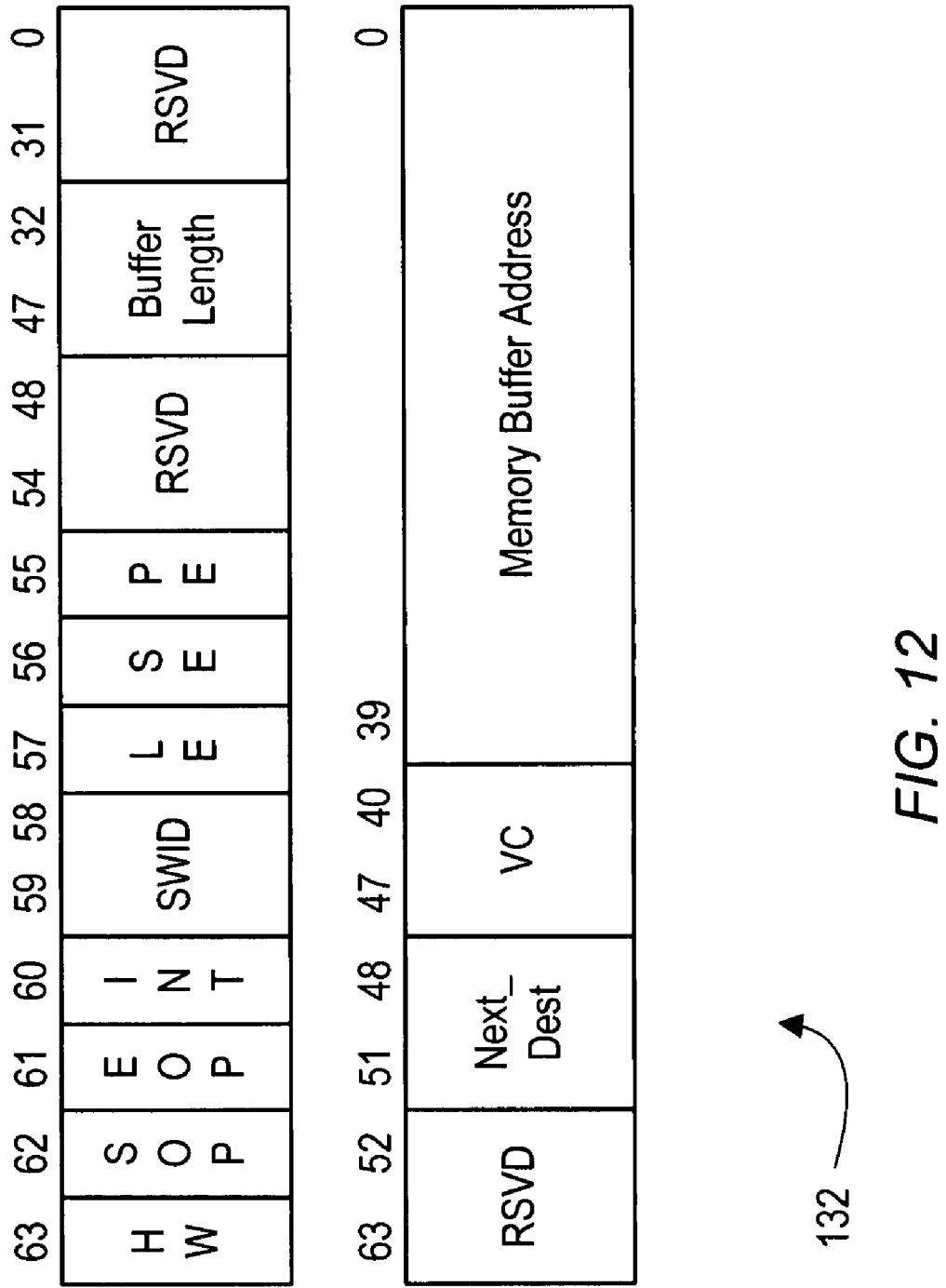
FIG. 12 is a block diagram of one embodiment of a descriptor shown in FIG. 11.

FIG. 12 is a block diagram of one embodiment of a descriptor 132. In the embodiment of FIG. 12, the descriptor 132 comprises 16 bytes illustrated as two 8 byte words. The bit ranges for the fields within each 8 bytes are shown above the fields. Fields labeled RSVD are reserved.

The descriptor 132 includes a variety of status information stored in bits 63:55 of the first 8 byte word. In particular, a hardware bit (HW) is included. Software may set the HW bit to indicate that the descriptor 132 is available for packet DMA circuit 16 use. Alternatively or in addition, software may update the count field described above to indicate that the descriptor 132 is available packet DMA circuit 16 use. The packet DMA circuit 16 may clear the HW bit to return the descriptor to software.

The SOP and EOP bits are used to indicate whether the memory buffer corresponding to the descriptor includes the start of the packet or the end of the packet. A packet may be stored in one or more memory buffers. If the memory buffer located by the descriptor 132 includes the start of a packet, the SOP bit is set. Otherwise, the SOP bit is clear. If the memory buffer includes the end of the packet, the EOP bit is set. Otherwise, the EOP bit is clear. Thus, if a packet is stored in one memory buffer, both the EOP and SOP bits in that descriptor are set. If a packet is stored in more than one memory buffer, the SOP bit in the descriptor corresponding to the first memory buffer is set and the EOP bit in the descriptor corresponding to the last memory buffer is set. Other EOP and SOP bits in the descriptors are clear. For input queue descriptors, the packet DMA circuit 16 sets or clears the EOP and SOP bits when writing the updated descriptor back to memory after writing packet data into the memory buffer. For output queue descriptors, software sets or clears the EOP and SOP bits when generating the descriptors for the packets.

The INT bit is used to indicate if the packet DMA circuit 16 is to generate an interrupt when the descriptor is complete (e.g. when the packet DMA circuit 16 is writing the updated descriptor back to memory). Software may set the INT bit to cause the interrupt and clear the INT bit to not cause the interrupt.

The SWID may indicate the interface circuit on which the packet was received, for input queue descriptors. The LE bit may indicate, when set, that an error was encountered in the Rx circuit 26A-26C that received the packet. In particular, if the Rx circuit is receiving SPI-4 phase 2 traffic, the LE bit may indicate, when set, that a DIP-4 error occurred. The SE bit may indicate, when set, that a SPI-4 abort control word was received in the packet or an error was detected in a PoHT transaction. The PE bit may indicate, when set, that the packet DMA circuit detected an error when transferring the packet.

The buffer length field indicates the size of the memory buffer indicated by the descriptor 132 (in bytes). For input queue descriptors, the packet DMA circuit 16 may overwrite the buffer length field to indicate the actual length used to store packet data.

The next_dest field in the descriptor is used, for output queue descriptors, to store the next_dest value for PoHT packets. The packet DMA circuit 16 may read the next_dest field and transmit the value with the packet to the Tx circuit 28A-28C that is to transmit the packet.

The VC field stores the IVC for a received packet, if the packet was transmitted on the SPI interface. For output queue descriptors, the VC field may store a value for which the most significant 4 bits are transmitted to the Tx circuit 28A-28C to transmit the packet, and the Tx circuit 28A-28C may append the bits to the OVC to generate the VC field in the SPI-4 packet. The memory buffer address field stores the address of the memory buffer indicated by the descriptor 132.

It is noted that, while various bits have been described above as having certain meanings when set or clear, the opposite meanings may be assigned to the set and clear states. Generally, any indication may be used in various embodiments.

Coherency Management

Turning next to FIG. 13, a table 142 is shown illustrating an exemplary set of transactions supported by one embodiment of the interconnect 22 and a table 144 is shown illustrating an exemplary set of coherency commands supported by one embodiment of the interfaces 30. Other embodiments including subsets, supersets, or alternative sets of commands may be used.

The transactions illustrated in the table 142 will next be described. An agent in the system 10 may read a cache block (either remote or local) using the read shared (RdShd) or read exclusive (RdExc) transactions on the interconnect 22. The RdShd transaction is used to request a shared copy of the cache block, and the RdExc transaction is used to request an exclusive copy of the cache block. If the RdShd transaction is used, and no other agent reports having a copy of the cache block during the response phase of the transaction (except for the L2 cache 36 and/or the memory controller 14), the agent may take the cache block in the exclusive state. In response to the RdExc transaction, other agents in the node invalidate their copies of the cache block (if any). Additionally, an exclusive (or modified) owner of the cache block may supply the data for the transaction in the data phase. Other embodiments may employ other mechanisms (e.g. a retry on the interconnect 22) to ensure the transfer of a modified cache block.

The write transaction (Wr) and the write invalidate transaction (WrInv) may be used by an agent to write a cache block to memory. The Wr transaction may be used by an owner having the modified state for the block, since no other copies of the block need to be invalidated. The WrInv transaction may be used by an agent that does not have exclusive ownership of the block (the agent may even have the invalid state for the block). The WrInv transaction causes other agents to invalidate any copies of the block, including modified copies. The WrInv transaction may be used by an agent that is writing the entire cache block. For example, a DMA that is writing the entire cache block with new data may use the transaction to avoid a read transaction followed by a write transaction. Particularly, the packet DMA circuit 16 may use WrInv transactions to write packet data to memory.

The RdKill and RdInv transactions may be used by the memory bridge 32 in response to probes received by the system 10 from other nodes. The RdKill and RdInv transactions cause the initiator (the memory bridge 32) to acquire exclusive access to the cache block and cause any cache agents to invalidate their copies (transferring data to the initiator similar to the RdShd and RdExc transactions). In one embodiment, the RdKill transaction also cancels a reservation established by the load-linked instruction in the MIPS instruction set, while the RdInv transaction does not. In other embodiments, a single transaction may be used for probes. In still other embodiments, there may be a probe-generated transaction that invalidates agent copies of the cache block (similar to the RdKill and RdInv transactions) and another probe-generated transaction that permits agents to retain shared copies of the cache block.

The WrFlush transaction is a write transaction which may be initiated by an agent and another agent may have an exclusive or modified copy of the block. The other agent provides the data for the WrFlush transaction, or the initiating agent provides the data if no other agent has an exclusive or modified copy of the block. The WrFlush transaction may be used, in one embodiment in which the L2 cache 36 retains the node state for the system 10 but other agents may have the cache block in a modified state as well. The L2 cache 36 may use the WrFlush command to evict a remote cache block which may be modified in a cache of another agent in the system 10.

The Nop transaction is a no-operation transaction. The Nop may be used if an agent is granted use of the interconnect 22 (e.g. the address bus, in embodiments in which the interconnect 22 is a split transaction bus) and the agent determines that it no longer has a transaction to run on the interconnect 22.

The commands illustrated in the table 144 will next be described. In the table 144, the command is shown as well as the virtual channel in which the command travels on the interfaces 30. The virtual channels may include, in the illustrated embodiment: the coherent read (CRd) virtual channel; the probe (Probe) virtual channel; the acknowledge (Ack) virtual channel; and coherent fill (CFill) virtual channel. The CRd Probe, Ack, and CFill virtual channels are defined for the HTcc commands. There may be additional virtual channels for the standard HT commands (e.g. the non-posted command (NPC) virtual channel, the posted command (PC) virtual channel, and the response (RSP) virtual channel).

The cRdShd or cRdExc commands may be issued by the memory bridge 32 in response to RdShd or RdExc transactions on the interconnect 22, respectively, to read a remote cache block not stored in the node (or, in the case of RdExc, the block may be stored in the node but in the shared state). If the cache block is stored in the node (with exclusive ownership, in the case of the RdExc transaction), the read is completed on the interconnect 22 without any coherency command transmission by the memory bridge 32.

The Flush and Kill commands are probe commands for this embodiment. The memory bridge 32 at the home node of a cache block may issue probe commands in response to a cRdShd or cRdExc command. The memory bridge 32 at the home node of the cache block may also issue a probe command in response to a transaction for a local cache block, if one or more remote nodes has a copy of the cache block. The Flush command is used to request that a remote modified owner of a cache block return the cache block to the home node (and invalidate the cache block in the remote modified owner). The Kill command is used to request that a remote owner invalidate the cache block. In other embodiments, additional probe commands may be supported for other state change requests (e.g. allowing remote owners to retain a shared copy of the cache block).

The probe commands are responded to (after effecting the state changes requested by the probe commands) using either the Kill_Ack or WB commands. The Kill_Ack command is an acknowledgement that a Kill command has been processed by a receiving node. The WB command is a write back of the cache block, and is transmitted in response to the Flush command. The WB command may also be used by a node to write back a remote cache block that is being evicted from the node.

The Fill command is the command to transfer data to a remote node that has transmitted a read command (cRdExc or cRdShd) to the home node. The Fill command is issued by the memory bridge 32 in the home node after the probes (if any) for a cache block have completed.

Figure 14:
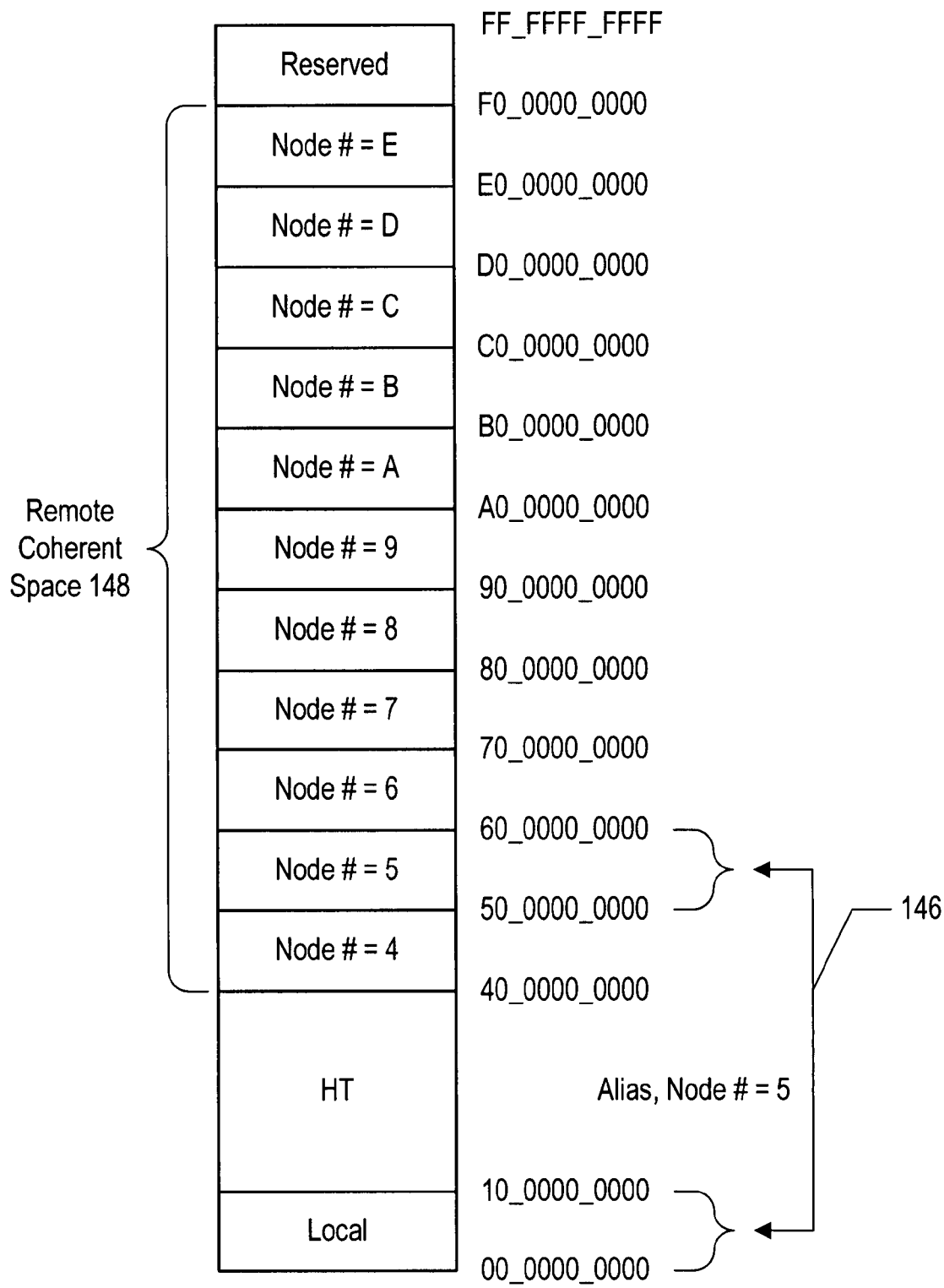
FIG. 14 is a block diagram of one embodiment of an address space used by one embodiment of the system.

Turning next to FIG. 14, a block diagram illustrating one embodiment of an address space implemented by one embodiment of the system 10 is shown. Addresses shown in FIG. 14 are illustrated as hexadecimal digits, with an under bar ("_") separating groups of four digits. Thus, in the embodiment illustrated in FIG. 14, 40 bits of address are supported. In other embodiments, more or fewer address bits may be supported.

In the embodiment of FIG. 14, the address space between 00_0000_0000 and 0F_FFFF_FFFF is treated as local address space. Transactions generated by agents in the local address space do not generate coherency commands to other nodes, although coherency may be enforced within the system 10 for these addresses. That is, the local address space is not maintained coherent with other nodes. Various portions of the local address space may be memory mapped to I/O devices, HT, etc. as desired.

The address space between 40_0000_0000 and EF_FFFF_FFFF is the remote coherent space 148. That is, the address space between 40_0000_0000 and EF_FFFF_FFFF is maintained coherent between the nodes. Each node is assigned a portion of the remote coherent space, and that node is the home node for the portion. As shown in FIG. 1, each node is programmable with a node number. The node number is equal to the most significant nibble (4 bits) of the addresses for which that node is the home node, in this embodiment. Thus, the node numbers may range from 4 to E in the embodiment shown. Other embodiments may support more or fewer node numbers, as desired. In the illustrated embodiment, each node is assigned a 64 Gigabyte (GB) portion of the memory space for which it is the home node. The size of the portion assigned to each node may be varied in other embodiments (e.g. based on the address size or other factors).

For a given coherent node, there is an aliasing between the remote coherent space for which that node is the home node and the local address space of that node. That is, corresponding addresses in the local address space and the portion of the remote coherent space for which the node is the home node access the same memory locations in the memory 24 of the node (or are memory mapped to the same I/O devices or interfaces, etc.). For example, the node having node number 5 aliases the address space 50_0000_0000 through 5F_FFFF_FFFF to 00_0000_0000 through 0F_FFFF_FFFF respectively (arrow 146). Internode coherent accesses to the memory 24 at the system 10 use the node-numbered address space (e.g. 50_0000_0000 to 5F_FFFF_FFFF, if the node number programmed into system 10 is 5) to access cache blocks in the memory 24. That is, agents in other nodes and agents within the node that are coherently accessing cache blocks in the memory use the remote coherent space, while access in the local address space are not maintained coherent with other nodes (even though the same cache block may be accessed). Thus the addresses are aliased, but not maintained coherent, in this embodiment. In other embodiments, the addresses in the remote coherent space and the corresponding addresses in the local address space may be maintained coherent.

A cache block is referred to as local in a node if the cache block is part of the memory assigned to the node (as mentioned above). Thus, the cache block may be local if it is accessed from the local address space or the remote coherent space, as long as the address is in the range for which the node is the home node. Similarly, a transaction on the interconnect 22 that accesses a local cache block may be referred to as a local transaction or local access. A transaction on the interconnect 22 that accesses a remote cache block (via the remote coherent address space outside of the portion for which the node is the home node) may be referred to as a remote transaction or a remote access.

The address space between 10_0000_0000 and 3F_FFFF_FFFF may be used for additional HT transactions (e.g. standard HT transactions) in the illustrated embodiment. Additionally, the address space between F0_0000_0000 and FF_FFFF_FFFF may be reserved in the illustrated embodiment.

It is noted that, while the most significant nibble of the address defines which node is being accessed, other embodiments may use any other portion of the address to identify the node. Furthermore, other information in the transaction may be used to identify remote versus local transactions, in other embodiments (e.g. command type, control information transmitted in the transaction, etc.).

Figure 15:
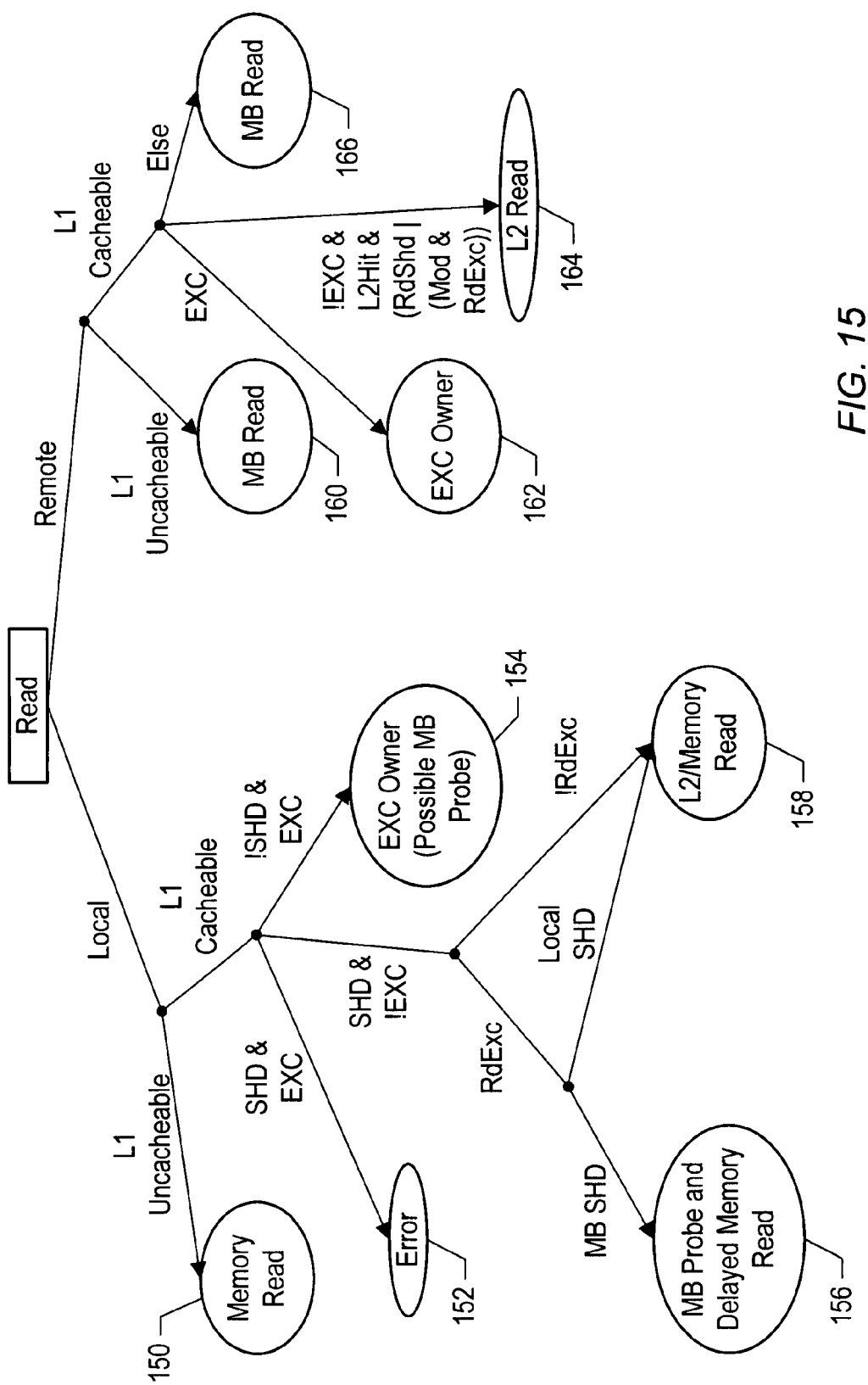
FIG. 15 is a decision tree illustrating operation of one embodiment of a node for a read transaction on the interconnect within the system.

Turning next to FIG. 15, a decision tree for a read transaction to a memory space address on the interconnect 22 of a system 10 is shown for one embodiment. The decision tree may illustrate operation of the system 10 for the read transaction for different conditions of the transaction, the state of the cache block accessed by the transaction, etc. The read transaction may, in one embodiment, include the RdShd, RdExc, RdKill, and RdInv transactions shown in the table 142 of FIG. 13. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 15, the exclamation point ("!") is used to indicate a logical NOT. Not shown in FIG. 15 is the state transition made by each coherent agent which is caching a copy of the cache block for the read transaction. If the read transaction is RdShd, the coherent agent may retain a copy of the cache block in the shared state. Otherwise, the coherent agent invalidates its copy of the cache block.

The transaction may be either local or remote, as mentioned above. For local transactions, if the transaction is uncacheable, then a read from the memory 24 is performed (reference numeral 150). In one embodiment, the transaction may include an indication of whether or not the transaction is cacheable. If the transaction is uncacheable, it is treated as a non-coherent transaction in the present embodiment.

If the local transaction is cacheable, the operation of the system 10 is dependent on the response provided during the response phase of the transaction. In one embodiment, each coherent agent responds with the state of the cache block in that agent. For example, each coherent agent may have an associated shared (SHD) and exclusive (EXC) signal. The agent may signal invalid state by deasserting both the SHD and EXC signals. The agent may signal shared state by asserting the SHD signal and deasserting the EXC signal. The agent may signal exclusive state (or modified state) by asserting the EXC signal and deasserting the SHD signal. The exclusive and modified states may be treated the same in the response phase in this embodiment, and the exclusive/modified owner may provide the data. The exclusive/modified owner may provide, concurrent with the data, an indication of whether the state is exclusive or modified. While each agent may have its own SHD and EXC signals in this embodiment (and the initiating agent may receive the signals from each other agent), in other embodiments a shared SHD and EXC signal may be used by all agents.

If both the SHD and EXC responses are received for the local transaction, an error has occurred (reference numeral 152). The memory controller may return a fatal error indication for the read transaction, in one embodiment. If the response is exclusive (SHD deasserted, EXC asserted), the exclusive owner provides the data for the read transaction on the interconnect 22 (reference numeral 154). If the exclusive owner is the memory bridge 32 (as recorded in the remote line directory 34), then a remote node has the cache block in the modified state. The memory bridge 32 issues a probe (Flush command) to retrieve the cache block from that remote node. The memory bridge 32 may supply the cache block returned from the remote node as the data for the read on the interconnect 22.

If the response is shared (SHD asserted, EXC deasserted), the local transaction is RdExc, and the memory bridge 32 is one of the agents reporting shared, then at least one remote node may have a shared copy of the cache block. The memory bridge 32 may initiate a probe (Kill command) to invalidate the shared copies of the cache block in the remote node(s) (reference numeral 156). In one embodiment, the data may be read from memory (or the L2 cache 36) for this case, but the transfer of the data may be delayed until the remote node(s) have acknowledged the probe. The memory bridge 32 may signal the memory controller 14/L2 cache 36 when the acknowledgements have been received. In one embodiment, each transaction may have a transaction identifier on the interconnect 22. The memory bridge 32 may transmit the transaction identifier of the RdExc transaction to the memory controller 14/L2 cache 36 to indicate that the data may be transmitted.

If the response is shared, the local transaction is RdExc, and the sharing agents are local agents (i.e. the memory bridge 32 does not report shared), then the L2 cache 36 or the memory controller 14 may supply the data, depending on whether or not there is an L2 hit for the cache block (reference numeral 158). Similarly, if the response is shared and the transaction is not RdExc, the L2 cache 36 or the memory controller 14 may supply the data dependent on whether or not there is an L2 hit for the cache block.

If the transaction is remote and uncacheable, then the memory bridge 32 may generate a noncoherent read command on the interfaces 30 to read the data. For example, a standard HT read command may be used (reference numeral 160). If the remote transaction is cacheable and the response on the interconnect 22 is exclusive, then the exclusive owner supplies the data for the read (reference numeral 162). If the remote transaction is cacheable, the response is not exclusive, the cache block is an L2 cache hit, and the transaction is either RdShd or the transaction is RdExc and the L2 cache has the block in the modified state, then the L2 cache 36 supplies the data for the read (reference numeral 164). Otherwise, the memory bridge 32 initiates a corresponding read command to the home node of the cache block (reference numeral 166).

Figure 16:
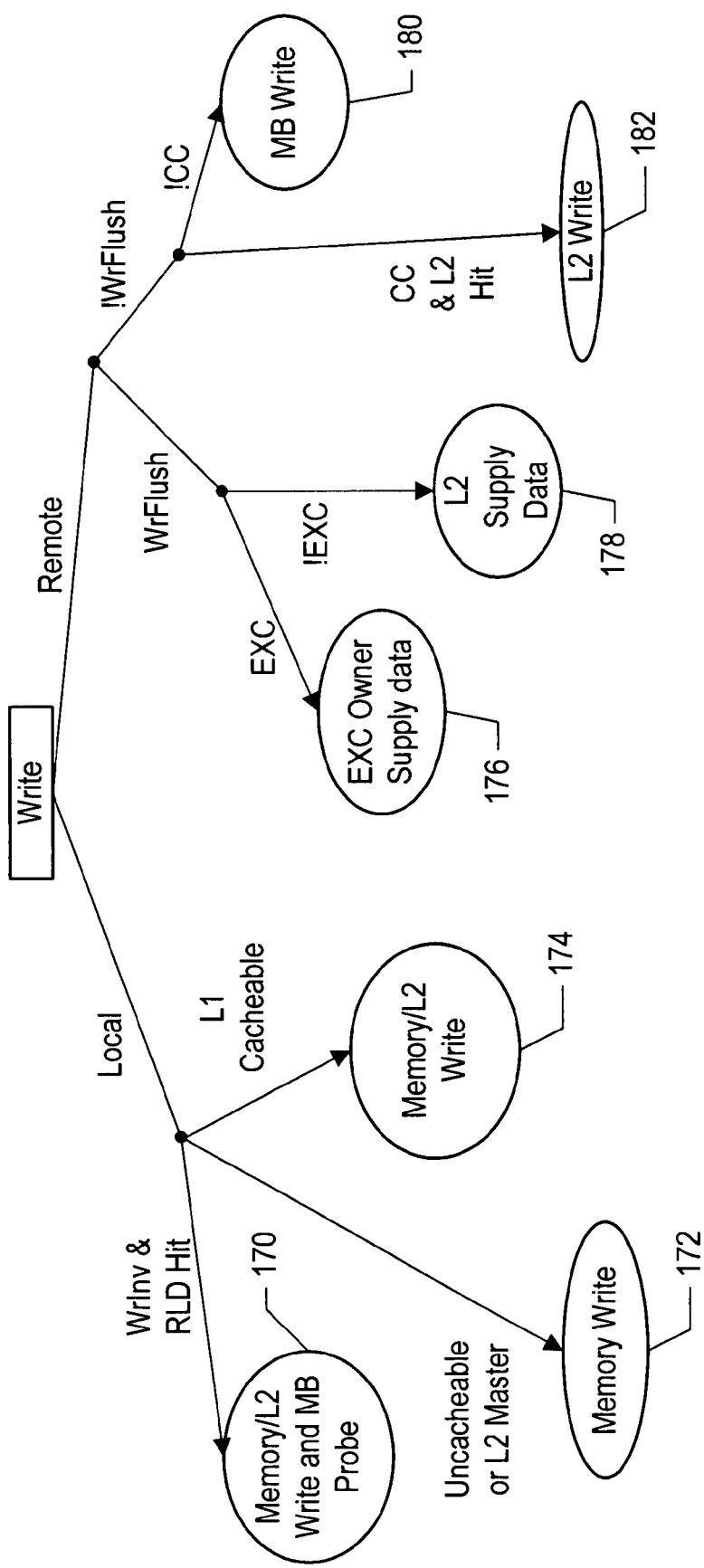
FIG. 16 is a decision tree illustrating operation of one embodiment of a node for a write transaction on the interconnect within the system.

Turning next to FIG. 16, a decision tree for a write transaction to a memory space address on the interconnect 22 of a system 10 is shown for one embodiment. The decision tree may illustrate operation of the node for the write transaction for different conditions of the transaction, the state of the cache block accessed by the transaction, etc. The write transaction may, in one embodiment, include the Wr, WrInv, and WrFlush transactions shown in the table 142 of FIG. 13. Each dot on the lines within the decision tree represents a divergence point of one or more limbs of the tree, which are labeled with the corresponding conditions. Where multiple limbs emerge from a dot, taking one limb also implies that the conditions for the other limbs are not met. In FIG. 16, the exclamation point ("!") is used to indicate a logical NOT. Not shown in FIG. 16 is the state transition made by each coherent agent which is caching a copy of the cache block for the write transaction. The coherent agent invalidates its copy of the cache block.

If the transaction is a local transaction, and the transaction is a WrInv transaction that hits in the remote line directory 34 (i.e. a remote node is caching a copy of the cache block), the memory controller 14 (and the L2 cache 36, if an L2 hit) updates with the write data (reference numeral 170). Additionally, the memory bridge 32 may generate probes to the remote nodes indicated by the remote line directory 34. The update of the memory/L2 cache may be delayed until the probes have been completed, at which time the memory bridge 32 may transmit the transaction identifier of the WrInv transaction to the L2 cache 36/memory controller 14 to permit the update.

If the local transaction is uncacheable or if the L2 cache 36 is the master of the transaction (that is, the L2 cache 36 initiated the transaction), then the memory controller 14 updates with the data (reference numeral 172). If the local transaction is cacheable, the memory controller 14 and/or the L2 cache 36 updates with the data based on whether or not there is an L2 cache hit (and, in some embodiments, based on an L2 cache allocation indication in the transaction, which allows the source of the transaction to indicate whether or not the L2 cache allocates a cache line for an L2 cache miss) (reference numeral 174A).

If the transaction is a remote transaction, the transaction is a WrFlush transaction, and the response to the transaction is exclusive, the exclusive owner supplies the data (reference numeral 176). If the remote WrFlush transaction results in a non-exclusive response (shared or invalid), the L2 cache 36 supplies the data of the WrFlush transaction (reference numeral 178). In one embodiment, the L2 cache 36 retains the state of the node as recorded in the home node, and the L2 cache 36 uses the WrFlush transaction to evict a remote cache block which is in the modified state in the node. Thus, if another agent has the cache block in the exclusive state, that agent may have a more recent copy of the cache block that should be returned to the home node. Otherwise, the L2 cache 36 supplies the block to be returned to the home node. In either case, the memory bridge 32 may capture the WrFlush transaction and data, and may perform a WB command to return the cache block to the home node.

If the remote transaction is not a WrFlush transaction, and is not cache coherent, the memory bridge 32 receives the write transaction and performs a non coherent write command (e.g. a standard HT write command) to transmit the cache block to the home node (reference numeral 180). If the remote transaction is not a WrFlush transaction, is cache coherent, and is an L2 hit, the L2 cache 36 may update with the data (reference numeral 182).

Figure 17:
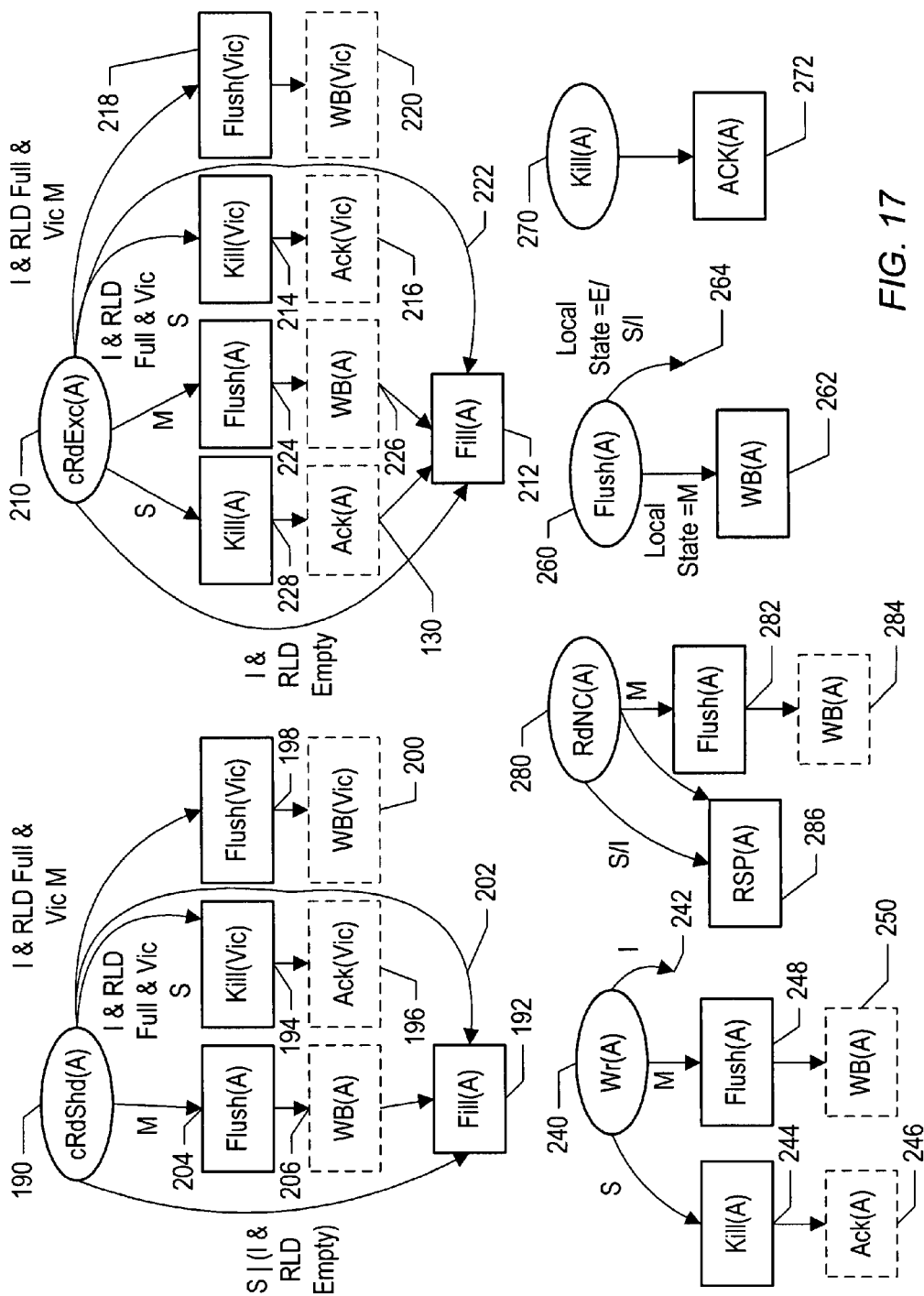
FIG. 17 is a diagram illustrating operation of one embodiment of the memory bridge shown in FIG. 1 for remote coherency commands received by the memory bridge.

Turning next to FIG. 17, a block diagram illustrating operation of one embodiment of the memory bridge 32 in response to various coherency commands received from the interface circuits 20A-20C is shown. The received command is shown in an oval. Commands initiated by the memory bridge 32 in response to the received command (and the state of the affected cache block as indicated in the remote line directory 34) are shown in solid boxes. Dotted boxes are commands received by the memory bridge 32 in response to the commands transmitted in the preceding solid boxes. The cache block affected by a command is shown in parentheses after the command.

In one embodiment, the remote line directory 34 may be accessed in response to a transaction on the interconnect 22. In such an embodiment, the memory bridge 32 may initiate a transaction on the interconnect 22 in response to certain coherent commands in order to retrieve the remote line directory 34 (as well as to affect any state changes in the coherent agents coupled to the interconnect 22, if applicable). In other embodiments, the memory bridge 32 may be configured to read the remote line directory 34 prior to generating a transaction on the interconnect 22, and may conditionally generate a transaction if needed based on the state of the remote line directory 34 for the requested cache block. Additionally, in one embodiment, the remote line directory 34 may maintain the remote state for a subset of the local cache blocks that are shareable remotely (e.g. a subset of the portion of the remote coherent space 148 that is assigned to the local node). If a cache block is requested by a remote node using a coherency command and there is no entry in the remote line directory 34 for the cache block, then a victim cache block may be replaced in the remote line directory 34 (and probes may be generated to invalidate the victim cache block in remote nodes). In other embodiments, the remote line directory 34 may be configured to track the state of each cache block in the portion of the remote coherent space 148 that is assigned to the local node. In such embodiments, operations related to the victim cache blocks may be omitted from FIG. 17.

For a cRdShd command for cache block "A" received by the memory bridge 32 (reference numeral 190), the memory bridge 32 may generate a RdShd transaction on the interconnect 22. Based on the remote line directory (RLD) state for the cache block A, a number of operations may occur. If the RLD state is shared, or invalid and there is an entry available for allocation without requiring a victim cache block to be evicted ("RLD empty" in FIG. 17), then the memory bridge 32 may transmit a fill command to the remote node with the data supplied to the memory bridge 32 in response to the RdShd transaction on the interconnect 22 (reference numeral 192). On the other hand, if the RLD state is invalid and an eviction of a victim block is used to free an RLD entry for cache block A, then the memory bridge 32 may transmit probes to the remote nodes having copies of the victim cache block. If the victim cache block is shared, the memory bridge 32 may transmit a Kill command (or commands, if multiple nodes are sharing the victim cache block) for the victim block (reference numeral 194). The remote nodes respond with Kill_Ack commands for the victim block (reference numeral 196). If the victim block is modified, the memory bridge 32 may transmit a Flush command to the remote node having the modified state (reference numeral 198). The remote node may return the modified block with a WB command (reference numeral 200). In either case of evicting a victim block, the memory bridge 32 may, in parallel, generate a Fill command for the cache block A (reference numeral 192, via arrow 202). Finally, if the RLD state is modified for the cache block A, the memory bridge 32 may generate a Flush command for the cache block A to the remote node (reference numeral 204), which responds with a WB command and the cache block A (reference numeral 206). The memory bridge 32 may then transmit the Fill command with the cache block A provided via the write back command (reference numeral 192).

In response to a cRdExc command for a cache block A (reference numeral 210), operation may be similar to the cRdShd case for some RLD states. Similar to the cRdShd case, the memory bridge 32 may initiate a RdExc transaction on the interconnect 22 in response to the cRdExc command. Similar to the cRdShd case, if the RLD is invalid and no eviction of a victim cache block is needed in the RLD to allocate an entry for the cache block A, then the memory bridge 32 may supply the cache block supplied on the interconnect 22 for the RdExc transaction in a fill command to the remote node (reference numeral 212). Additionally, if the RLD state is invalid for the cache block A and a victim cache block is evicted from the RLD 34, the memory bridge 32 may operate in a similar fashion to the cRdShd case (reference numerals 214 and 216 and arrow 222 for the shared case of the victim block and reference numerals 218 and 220 and arrow 222 for the modified case of the victim block). If the RLD state is modified for the cache block A, the memory bridge 32 may operate in a similar fashion to the cRdShd case (reference numerals 224 and 226). If the RLD state is shared for the cache block A, the memory bridge 32 may generate Kill commands for each remote sharing node (reference numeral 228). The memory bridge 32 may wait for the Kill_Ack commands from the remote sharing nodes (reference numeral 230), and then transmit the Fill command with the cache block A provided on the interconnect 22 in response to the RdExc transaction (reference numeral 212).

In response to a Wr command to the cache block A (e.g. a standard HT write command—reference numeral 240), the memory bridge 32 may generate a Wr transaction on the interconnect 22. If the RLD state is invalid for the cache block A, the memory bridge 32 may transmit the write data on the interconnect 22 and the Wr command is complete (reference numeral 242). If the RLD state is shared for the cache block A, the memory bridge 32 may generate Kill commands to each remote sharing node (reference numeral 244) and collect the Kill_Ack commands from those remote nodes (reference numeral 246) in addition to transmitting the data on the interconnect 22. If the RLD state is modified for a remote node, the memory bridge 32 may generate a Flush command to the remote node (reference numeral 248) and receive the WB command from the remote node (reference numeral 250). In one embodiment, the memory bridge 32 may delay transmitting the write data on the interconnect 22 until the WB command or Kill_Ack commands are received (although the data returned with the WB command may be dropped by the memory bridge 32).

The above commands are received by the memory bridge 32 for cache blocks for which the system 10 including the memory bridge 32 is the home node. The memory bridge 32 may also receive Flush commands or Kill commands for cache blocks for which the system 10 is a remote node. In response to a Flush command to the cache block A (reference numeral 260), the memory bridge 32 may initiate a RdKill or RdInv transaction on the interconnect 22. If the local state of the cache block is modified, the memory bridge 32 may transmit a WB command to the home node, with the cache block supplied on the interconnect 22 in response to the RdKill or RdInv transaction (reference numeral 262). If the local state of the cache block is not modified, the memory bridge 32 may not respond to the Flush command (reference numeral 264). In this case, the node may already have transmitted a WB command to the home node (e.g. in response to evicting the cache block locally). In response to a Kill command to the cache block A (reference numeral 270), the memory bridge 32 may initiate a RdKill or RdInv transaction on the interconnect 22. The memory bridge 32 may respond to the Kill command with a Kill_Ack command (reference numeral 272).

In one embodiment, the memory bridge 32 may also be configured to receive a non-cacheable read (RdNC) command (e.g. corresponding to a standard HT read) (reference numeral 280). In response, the memory bridge 32 may initiate a RdShd transaction on the interconnect 22. If the RLD state is modified for the cache block including the data to be read, the memory bridge 32 may transmit a Flush command to the remote node having the modified cache block (reference numeral 282), and may receive the WB command from the remote node (reference numeral 284). Additionally, the memory bridge 32 may supply data received on the interconnect 22 in response to the RdShd transaction as a read response (RSP) to the requesting node (reference numeral 286).

FIG. 18 is a table illustrating one embodiment of remote line directory 34 updates in response to transactions on the interconnect 22. The source column in FIG. 18 indicates whether the source is a local coherent agent (e.g. the processors 12A-12N) or a remote agent (via the memory bridge 32). The transaction column in FIG. 18 indicates the transaction (one of the transactions from the table 142). The RLD state column in FIG. 18 indicates the state output by the remote line directory 34 in response to the transaction. The possible states in this embodiment are M (Modified), S (Shared), or I (Invalid, or miss). The New RLD state column in FIG. 18 indicates the state to which the remote line directory 34 updates in response to the transaction. The Set Owner? column in FIG. 18 indicates whether or not the remote node that caused the transaction is indicated as an owner in the remote line directory 34 (where "—" means don't care). The Reset Other Owners? column indicates whether or not other owners that may be indicated in the remote line directory 34 are removed.

Numerous variations and modifications will become apparent to those skilled in the art once the above disclosure is fully appreciated. It is intended that the following claims be interpreted to embrace all such variations and modifications.

What is claimed is:

1. An apparatus comprising:
a first system forming a first node of a multiple-node coherent system, in which the first system includes a first plurality of interface circuits that couple to interface circuits of one or more other nodes of the multiple-node coherent system, the first system also includes a first direct memory access (DMA) circuit to handle packet traffic and a first memory bridge to handle coherent and noncoherent non-packet traffic separate from the packet traffic, the first DMA circuit and the first memory bridge coupled to the first plurality of interface circuits and to a first interconnect internal to the first node to respectively transfer packet traffic and non-packet traffic between the first plurality of interface circuits and the first interconnect; and
a second system forming a second node of the multiple-node coherent system, in which the second system includes a second plurality of interface circuits that couple to interface circuits of one or more other nodes of the multiple-node coherent system, including the first node;
wherein the first interface circuits and the second interface circuits are separately programmable to receive and send packet traffic, coherent and noncoherent traffic that are not packet traffic, between the first and second nodes.

2. The apparatus of claim 1 wherein the first DMA circuit is to generate an address to access memory locations in a memory coupled to the second system for packet transfer.

3. The apparatus of claim 2 wherein the first memory bridge is to generate corresponding write commands in response to noncoherent write transactions of non-packet traffic between the first and second nodes.

4. The apparatus of claim 3 wherein the second system further includes a second direct memory access (DMA) circuit to handle packet traffic in the second node and a second memory bridge to handle coherent and noncoherent non-packet traffic separate from the packet traffic in the second node, the second DMA circuit and the second memory bridge coupled to the second plurality of interface circuits and to a second interconnect internal to the second node to respectively transfer second node packet traffic and second node non-packet traffic between the second plurality of interface circuits and the second interconnect.

5. The apparatus of claim 4 wherein the second DMA circuit is to generate an address to access memory locations in a memory coupled to the first system for packet transfer.

6. The apparatus of claim 5 wherein the second memory bridge is to generate corresponding write commands in response to noncoherent write transactions of non-packet traffic between the

* * * * *

UNITED STATES PATENT AND TRADEMARK OFFICE
CERTIFICATE OF CORRECTION

| | | |
|---|---|---|
| PATENT NO. | : 7,424,561 B2 | Page 1 of 1 |
| APPLICATION NO. | : 11/717511 | |
| DATED | : September 9, 2008 | |
| INVENTOR(S) | : Barton J. Sano et al. | |

It is certified that error appears in the above-identified patent and that said Letters Patent is hereby corrected as shown below:

Column 34, line 38, in Claim 6: after "traffic between the" insert --second and first nodes.--.

Signed and Sealed this

Twenty-fourth Day of March, 2009

JOHN DOLL
*Acting Director of the United States Patent and Trademark Office*